United States Patent
Nemoto

(10) Patent No.: US 12,233,339 B2
(45) Date of Patent: Feb. 25, 2025

(54) STORAGE MEDIUM STORING INFORMATION PROCESSING PROGRAM, INFORMATION PROCESSING SYSTEM, INFORMATION PROCESSING APPARATUS, AND INFORMATION PROCESSING METHOD

(71) Applicant: Nintendo Co., Ltd., Kyoto (JP)

(72) Inventor: Takashi Nemoto, Yamanashi (JP)

(73) Assignee: Nintendo Co., Ltd., Kyoto (JP)

( * ) Notice: Subject to any disclaimer, the term of this patent is extended or adjusted under 35 U.S.C. 154(b) by 438 days.

(21) Appl. No.: 17/883,420

(22) Filed: Aug. 8, 2022

(65) Prior Publication Data

US 2023/0076624 A1 Mar. 9, 2023

(30) Foreign Application Priority Data

Sep. 3, 2021 (JP) .................................. 2021-143741

(51) Int. Cl.
*A63F 13/56* (2014.01)

(52) U.S. Cl.
CPC .................................. *A63F 13/56* (2014.09)

(58) Field of Classification Search
CPC ................ A63F 13/525; A63F 13/5252; A63F 13/5258; A63F 13/55; A63F 13/56
See application file for complete search history.

(56) References Cited

U.S. PATENT DOCUMENTS

| 2013/0007300 A1 | 1/2013 | Candelaria et al. |
| 2013/0072300 A1* | 3/2013 | Kishimoto ............. A63F 13/47 463/32 |
| 2014/0028544 A1* | 1/2014 | Amano .................... G09G 5/00 345/156 |

FOREIGN PATENT DOCUMENTS

| JP | 2002-085845 | 3/2002 |
| JP | 2011-244962 | 12/2011 |
| JP | 2014-23719 | 2/2014 |

* cited by examiner

*Primary Examiner* — Jasson H Yoo

(74) *Attorney, Agent, or Firm* — Nixon & Vanderhye PC

(57) ABSTRACT

When a game object is located in an end range in a virtual space relating to a first end portion of a display range of a display image, the end range being in the display range, end control that causes the game object to remain in the end range is performed while a range of view is being moved in a first direction in the virtual space that is a direction perpendicular to the first end portion and aimed at inside of the display range and/or while the game object is performing an action of moving in a second direction opposite to the first direction. When the end control has continued for at least a waiting period, the game object is moved to a location other than the end range in a range in the virtual space relating to the display range.

20 Claims, 18 Drawing Sheets

F I G. 1 5
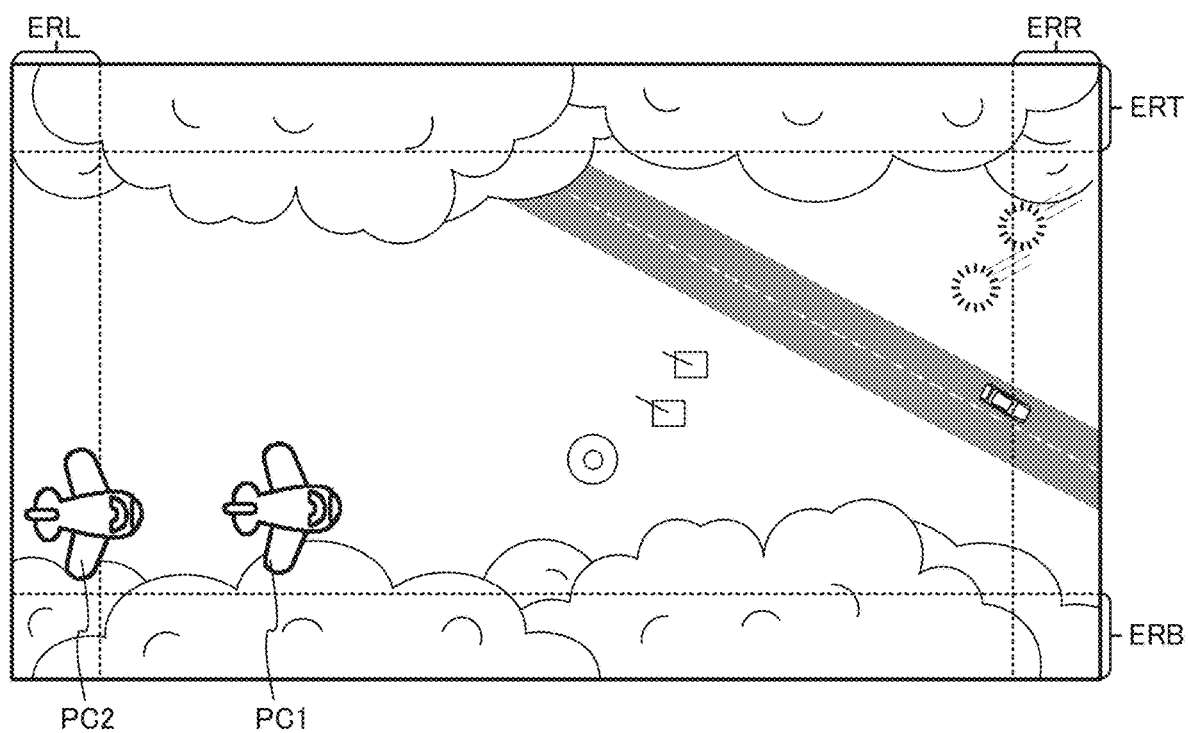

STORAGE MEDIUM STORING INFORMATION PROCESSING PROGRAM, INFORMATION PROCESSING SYSTEM, INFORMATION PROCESSING APPARATUS, AND INFORMATION PROCESSING METHOD

CROSS REFERENCE TO RELATED APPLICATION

This application claims priority to Japanese Patent Application No. 2021-143741, filed on Sep. 3, 2021, the entire contents of which are incorporated herein by reference.

FIELD

The technology disclosed herein relates to information processing program-storing media, information processing systems, information processing apparatuses, and information processing methods for performing a process using a game object.

BACKGROUND AND SUMMARY

There is a conventional information processing system that displays a game image in which when the period of time during which a second player object is out of a display range exceeds a predetermined length of time, the second player object is put into a defense state and approaches a first player object located in the display range.

However, in the abovementioned information processing system, surroundings of a player object that is out of the display range are not known, and therefore, a state of the player object cannot be recognized.

With the above in mind, it is an object of the present non-limiting example is to provide an information processing program-storing medium, information processing system, information processing apparatus, and information processing method capable of facilitating recognition of a state of a game object disposed in a virtual space, for example.

To achieve the object, the present non-limiting example may have the following features, for example.

In a non-limiting example configuration of a non-transitory computer-readable storage medium having stored therein an information processing program of this non-limiting example, a non-transitory computer-readable storage medium having stored therein an information processing program that when executed by a computer of an information processing apparatus, causes the computer to perform operations comprising: controlling movements of a first and a second game object in a virtual space, at least one of the first and second game objects being a player object that is operated by a user; controlling a range of view of a virtual camera based on a location in the virtual space of at least the first game object; and generating a display image to be displayed on a display screen, based on the virtual camera, wherein the controlling the game objects includes when the second game object is located in an end range in the virtual space relating to a first end portion of a display range of the display image, the end range being in the display range, performing end control that causes the second game object to remain in the end range while the range of view is being moved in a first direction in the virtual space that is a direction perpendicular to the first end portion and aimed at inside of the display range and/or while the second game object is performing an action of moving in a second direction opposite to the first direction, and moving the second game object to a location other than the end range in a range in the virtual space relating to the display range when the end control has continued for at least a waiting period.

Thus, even in a situation that the second game object of the plurality of game objects would be moved out of the display range of the display image in the above conventional example, the end control is performed to cause the second game object to remain in the display range, and after the end control has continued for at least a waiting period, the second game object is moved to a location other than the end range in the virtual space corresponding to the display range. Therefore, a state of a game object disposed in a virtual space can be easily recognized.

Further, the range of view of the virtual camera may be controlled such that the first game object is included in a central region of the display range.

Thus, while the first game object is always displayed in the central region of the display range, the second game object can also be always displayed. Therefore, a state of the second game object can be easily recognized even in a game in which the range of view is changed according to the location of the first game object (e.g., the first game object is always included in the range of view).

Further, when the second game object is located in the end range, the end control may be performed by forcing the second game object to move in the virtual space while the range of view is being moved in the first direction.

Thus, even when the second game object is being moved out of the display range of the display image due to a change in the display range, a state of the second game object, which is provided in the virtual space, can be easily recognized.

Further, when the range of view is moved in the first direction with the second game object located in the end range, the second game object may be forced to move in the virtual space by causing the second game object to perform an action of moving from the end range toward a location in the virtual space relating to a central region of the display range.

Thus, the second game object looks like moving on its own, and therefore, a natural movement can be expressed.

Further, when the second game object is located in the end range, the end control may be performed by causing the second game object not to move out of the end range while the second game object is performing an action of moving in the second direction.

Thus, even when the second game object is being moved out of the display range of the display image due to the second game object's action of exiting the display range, a state in the virtual space of the second game object can be easily recognized.

Further, the first end portion may include a left end portion of the display image.

Thus, the present non-limiting example is useful in a game in which the display image is scrolled from right to left of a display screen while a game object is moved from left to right of the display screen.

Further, the first end portion may include a bottom end portion of the display image.

Thus, the present non-limiting example is useful in a game in which a game object is moved deep away from the virtual camera in the display screen.

Further, the information processing program further may cause the computer to perform operations comprising: determining a plane including a location in the virtual space relating to the bottom end of the display image as a virtual end plane, and when the second game object is located on the virtual end plane, the end control may be performed to cause the second game object to remain in a range in the virtual space relating to the virtual end plane while the range of view is being moved in a direction in the virtual space that is an upward direction of the display screen and/or while the second game object is performing an action of moving in a direction in the virtual space that is a downward direction of the display screen.

Thus, even when the second game object is being moved out of the display range of the display image from a bottom end thereof, a state in the virtual space of the second game object can be easily recognized.

Further, a vertical plane in the virtual space including a line segment that is an intersection of a horizontal plane in the virtual space on which the first game object is located and a plane in the virtual space relating to the bottom end of the display image may be determined as the virtual end plane.

Thus, in a game in which a game object is moved on a ground, the second game object can be prevented from being moved out of the screen from the bottom end.

Further, when the second game object is moved to a range in the virtual space relating to a range out of the display range without the end control, the second game object may be forced to move to a range in the virtual space relating to a range in the display range.

Thus, even when the second game object is moved out of the display range without the end control, a state in the virtual space of the second game object can be easily recognized.

Further, the end control may not be performed at a top end of the display image.

Thus, a natural movement of a game object can be expressed.

Further, when the second game object is moved in a direction away from the virtual camera along a line-of-view direction of the virtual camera, so that the second game object is at least a first distance away from the virtual camera or the first game object, the second game object may be forced to move to a location that is less than the first distance away from the virtual camera or the first game object.

Thus, the second game object can be prevented from being endlessly moved in a direction away from the virtual camera, and therefore, the user does not lose sight of the second game object.

Further, the range of view of the virtual camera may be controlled based on a user's operation, and when the range of view of the virtual camera is changed by the user's operation, the end range in the virtual space may be changed.

Thus, even when the display range of the display image is changed according to the user's operation independently of an action of the first game object, the end range can be set to coincide with an outer periphery of the display screen.

Further, even when the second game object is located in the end range, the second game object may not be controlled to move to a location other than the end range while the range of view is not being moved in the first direction and the second game object is not performing an action of moving in the second direction.

Thus, an impairment of the feeling of freely operating a game object can be prevented.

Further, when the end control has continued for at least the waiting period, the second game object may be moved to a location in a vicinity of the first game object.

Thus, the second game object can be displayed away from the end portion of the display range of the display image.

Further, when the end control has continued for at least the waiting period, the second game object may be moved to a location relating to a central region of the display range.

Thus, the second game object can be displayed in a central region of the display range of the display image.

Further, the end range in which the second game object remains may be set using a plane in the virtual space that is set, relating to the display range.

Thus, the end control can be easily embodied.

Further, this non-limiting example may be carried out in the form of an information processing system, information processing apparatus, and information processing method.

According to the present non-limiting example, a state of a game object disposed in a virtual space can be easily recognized.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 15 is a diagram illustrating a non-limiting example of a game image that is a two-dimensional image in which the first and second player characters PC1 and PC2 appear.

DETAILED DESCRIPTION OF NON-LIMITING EXAMPLE EMBODIMENTS

A game system according to the present non-limiting example will now be described. A non-limiting example of a game system 1 according to the present non-limiting example includes a main body apparatus (information processing apparatus serving as the main body of a game apparatus in the present non-limiting example) 2, a left controller 3, and a right controller 4, and also serves as an information processing system. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the description that follows, a hardware configuration of the game system 1 of the present non-limiting example is described, and thereafter, the control of the game system 1 of the present non-limiting example is described.

Figure 1:
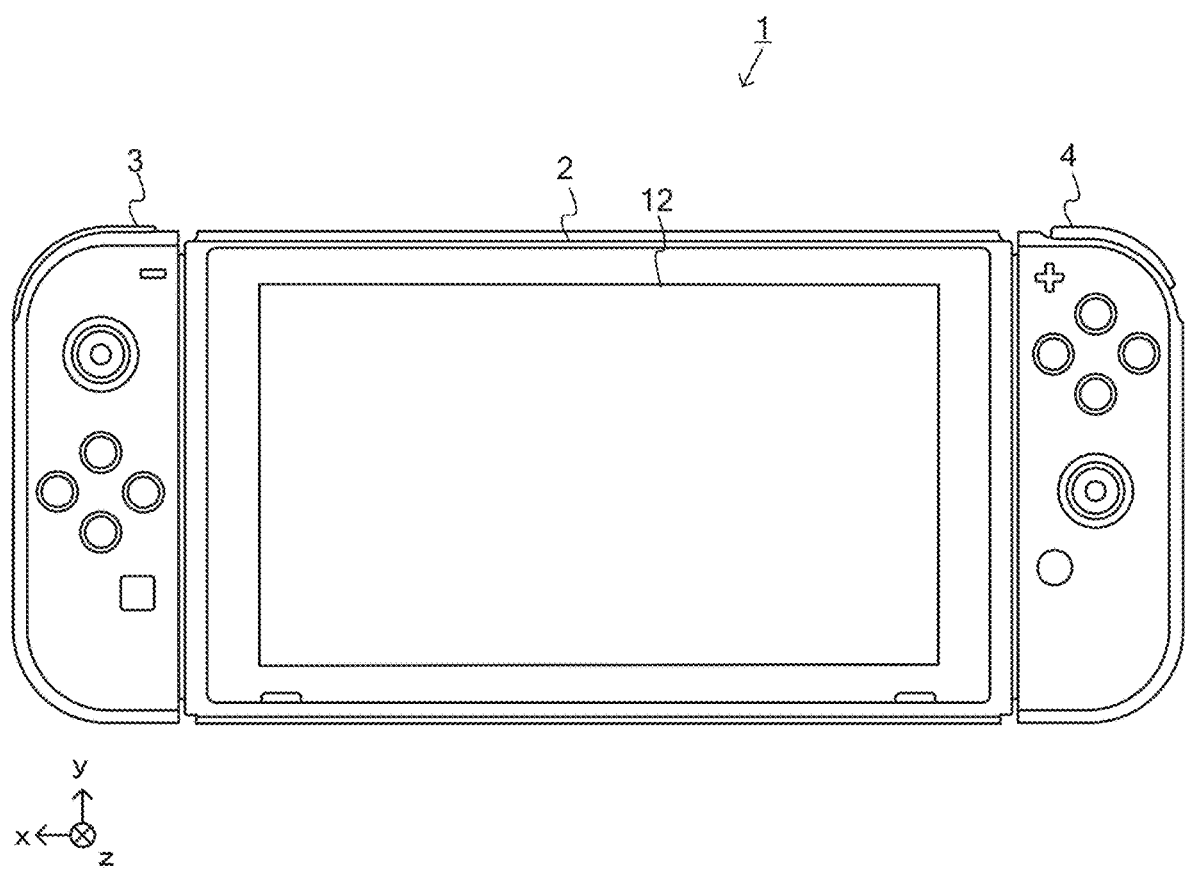
FIG. 1 is a diagram illustrating a non-limiting example of a state where a left controller 3 and a right controller 4 are attached to a main body apparatus 2.

FIG. 1 is a diagram illustrating a non-limiting example of the state where the left controller 3 and the right controller 4 are attached to the main body apparatus 2. As illustrated in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
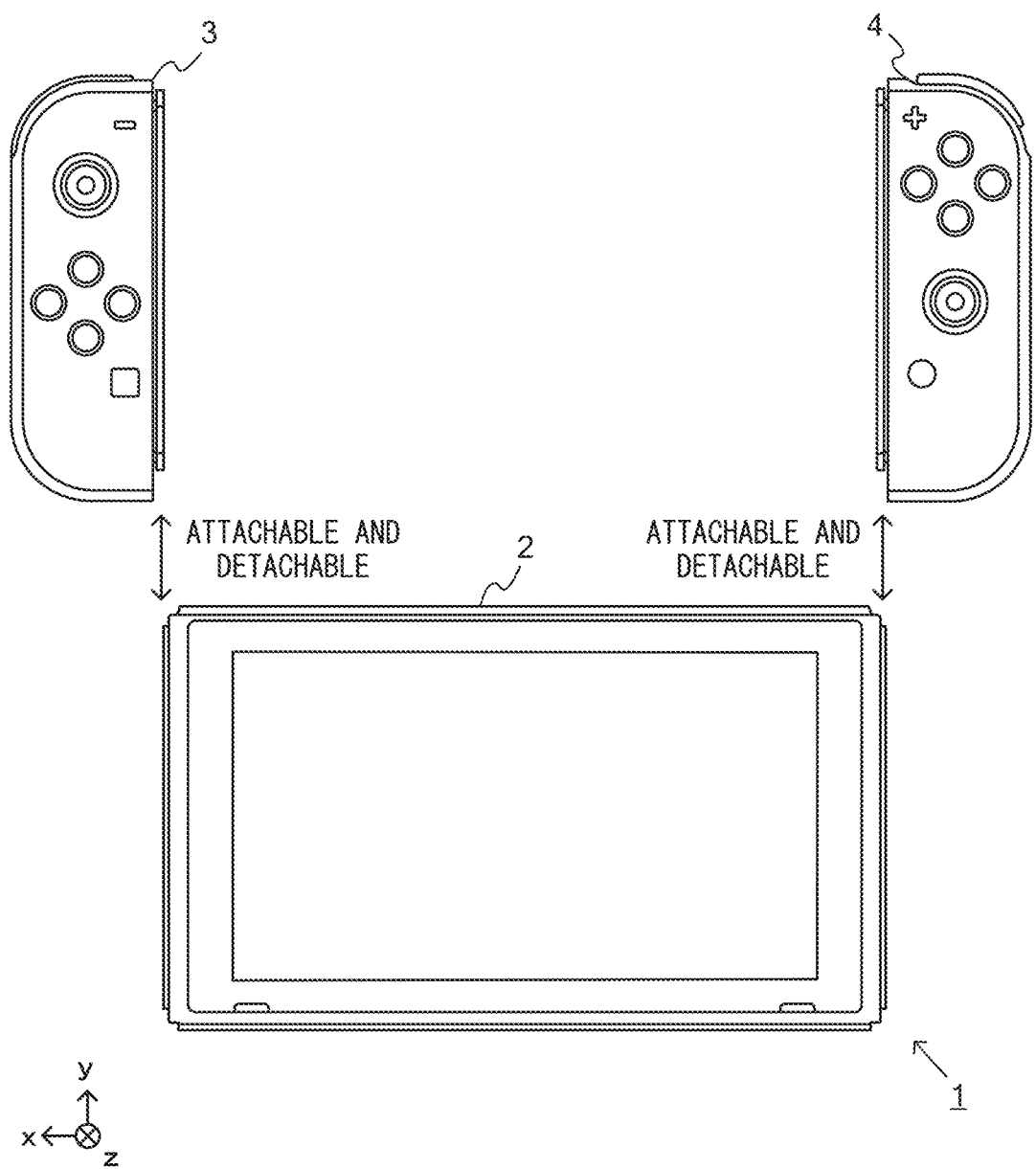
FIG. 2 is a diagram illustrating a non-limiting example of a state where the left controller 3 and the right controller 4 are detached from the main body apparatus 2.

FIG. 2 is a diagram illustrating a non-limiting example of the state where each of the left controller 3 and the right controller 4 is detached from the main body apparatus 2. As illustrated in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller."

Figure 3:
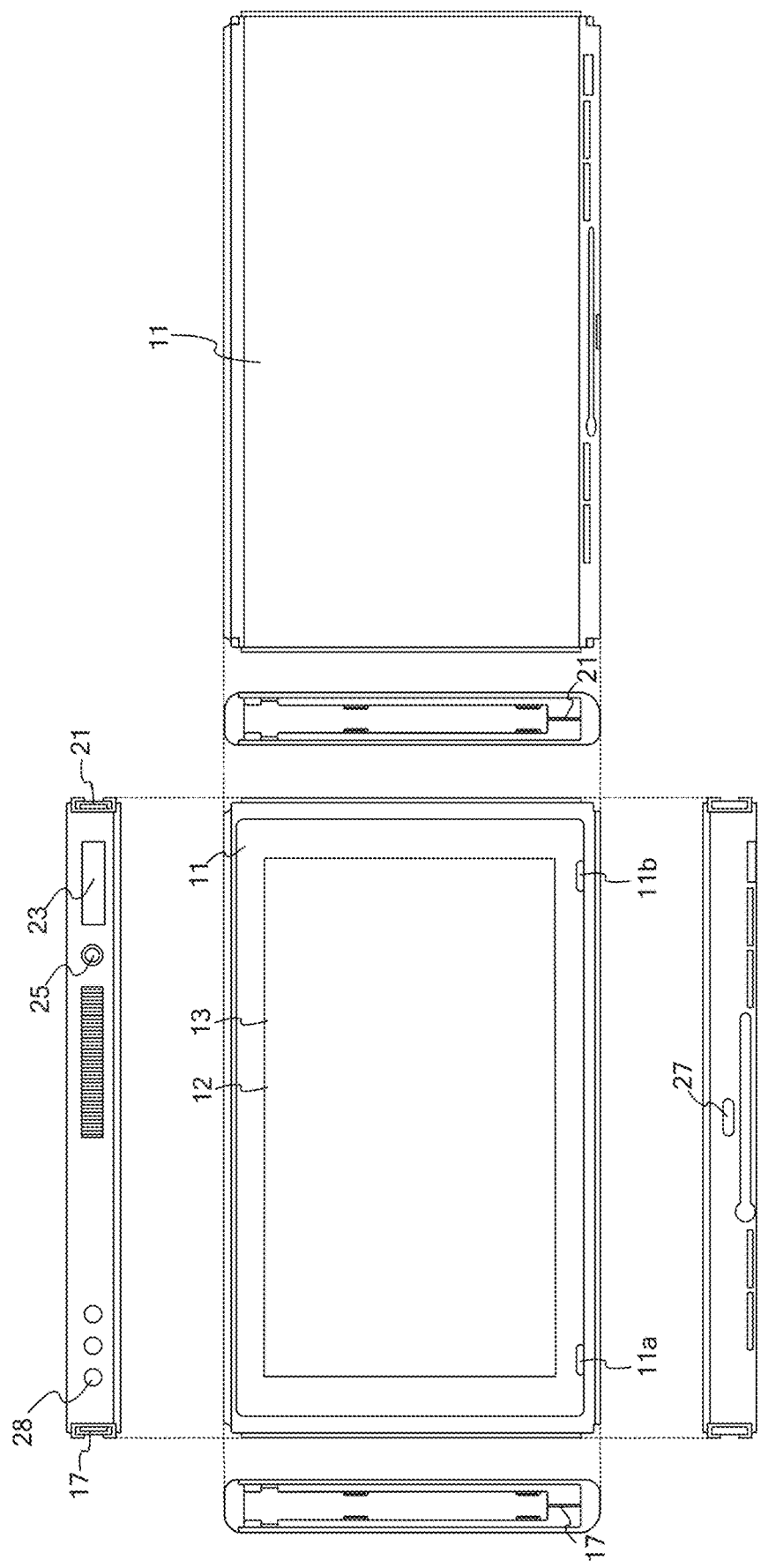
FIG. 3 is six orthogonal views illustrating a non-limiting example of the main body apparatus 2.

FIG. 3 is six orthogonal views illustrating a non-limiting example of the main body apparatus 2. As illustrated in FIG. 3, the main body apparatus 2 includes an approximately plate-shaped housing 11. In the present non-limiting example, a main surface (in other words, a surface on a front side, i.e., a surface on which the display 12 is provided) of the housing 11 has a generally rectangular shape.

It should be noted that the shape and the size of the housing 11 are optional. As a non-limiting example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As illustrated in FIG. 3, the main body apparatus 2 includes the display 12, which is provided on the main surface of the housing 11. The display 12 displays an image generated by the main body apparatus 2. In the present non-limiting example, the display 12 is a liquid crystal display device (LCD). The display 12, however, may be a display device of any suitable type.

In addition, the main body apparatus 2 includes a touch panel 13 on the screen of the display 12. In the present non-limiting example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 illustrated in FIG. 6) inside the housing 11. As illustrated in FIG. 3, speaker holes 11*a* and 11*b* are formed in the main surface of the housing 11. The speaker 88 outputs sounds through the speaker holes 11*a* and 11*b*.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As illustrated in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In the present non-limiting example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in the present non-limiting example, the cradle has the function of charging the unified apparatus or the main body apparatus 2 alone, being placed thereon. The cradle also functions as a hub device (specifically, a USB hub).

Figure 4:
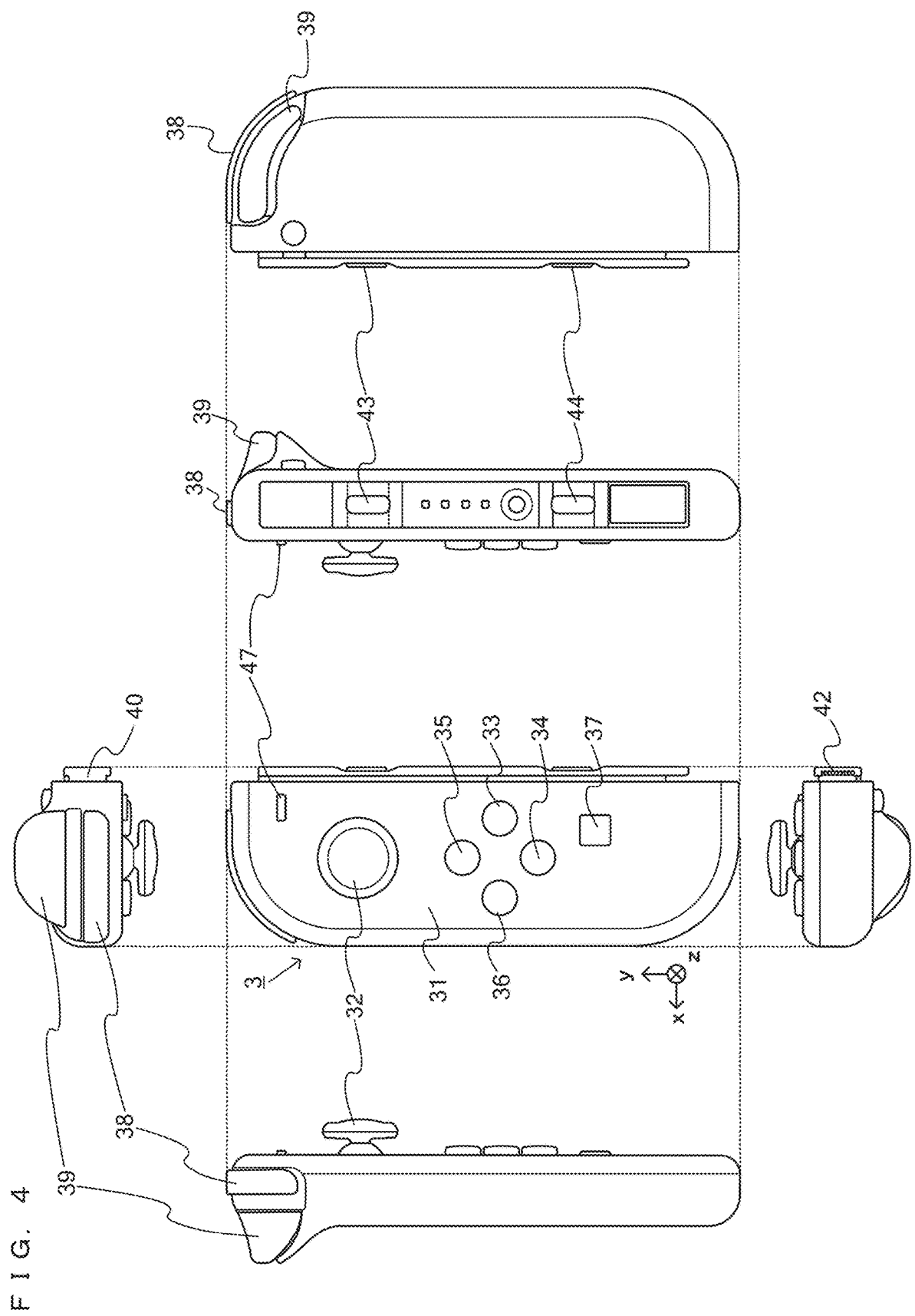
FIG. 4 is six orthogonal views illustrating a non-limiting example of the left controller 3.

FIG. 4 is six orthogonal views illustrating a non-limiting example of the left controller 3. As illustrated in FIG. 4, the left controller 3 includes a housing 31. In the present non-limiting example, the housing 31 has a vertically long shape, e.g., is shaped to be long in an up-down direction (i.e., a y-axis direction illustrated in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As illustrated in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the present non-limiting example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "—" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 also includes a terminal 42 that enables wired communication between the left controller 3 and the main body apparatus 2.

Figure 5:
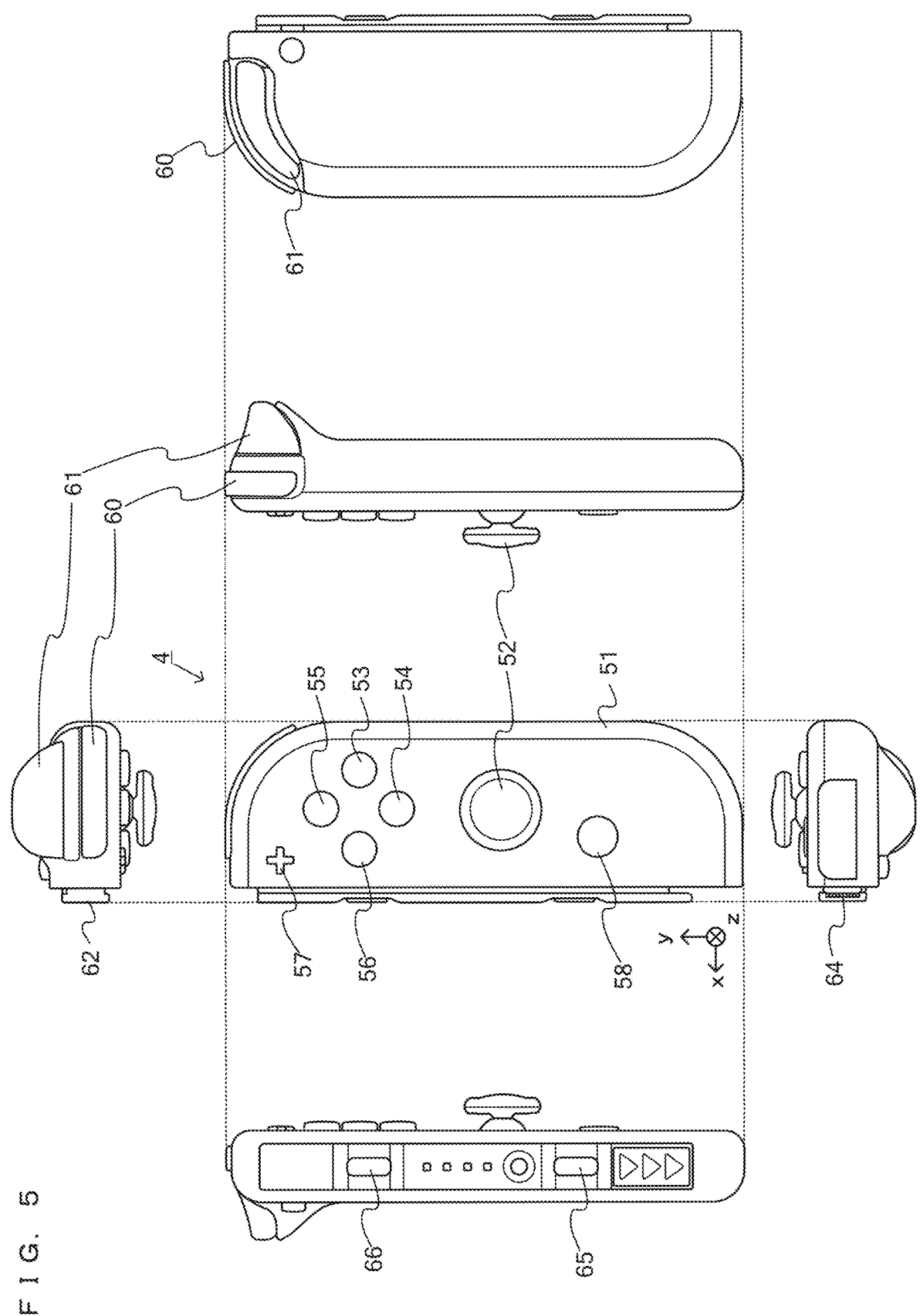
FIG. 5 is six orthogonal views illustrating a non-limiting example of the right controller 4.

FIG. 5 is six orthogonal views illustrating a non-limiting example of the right controller 4. As illustrated in FIG. 5, the right controller 4 includes a housing 51. In the present non-limiting example, the housing 51 has a vertically long shape, e.g., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the present non-limiting example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
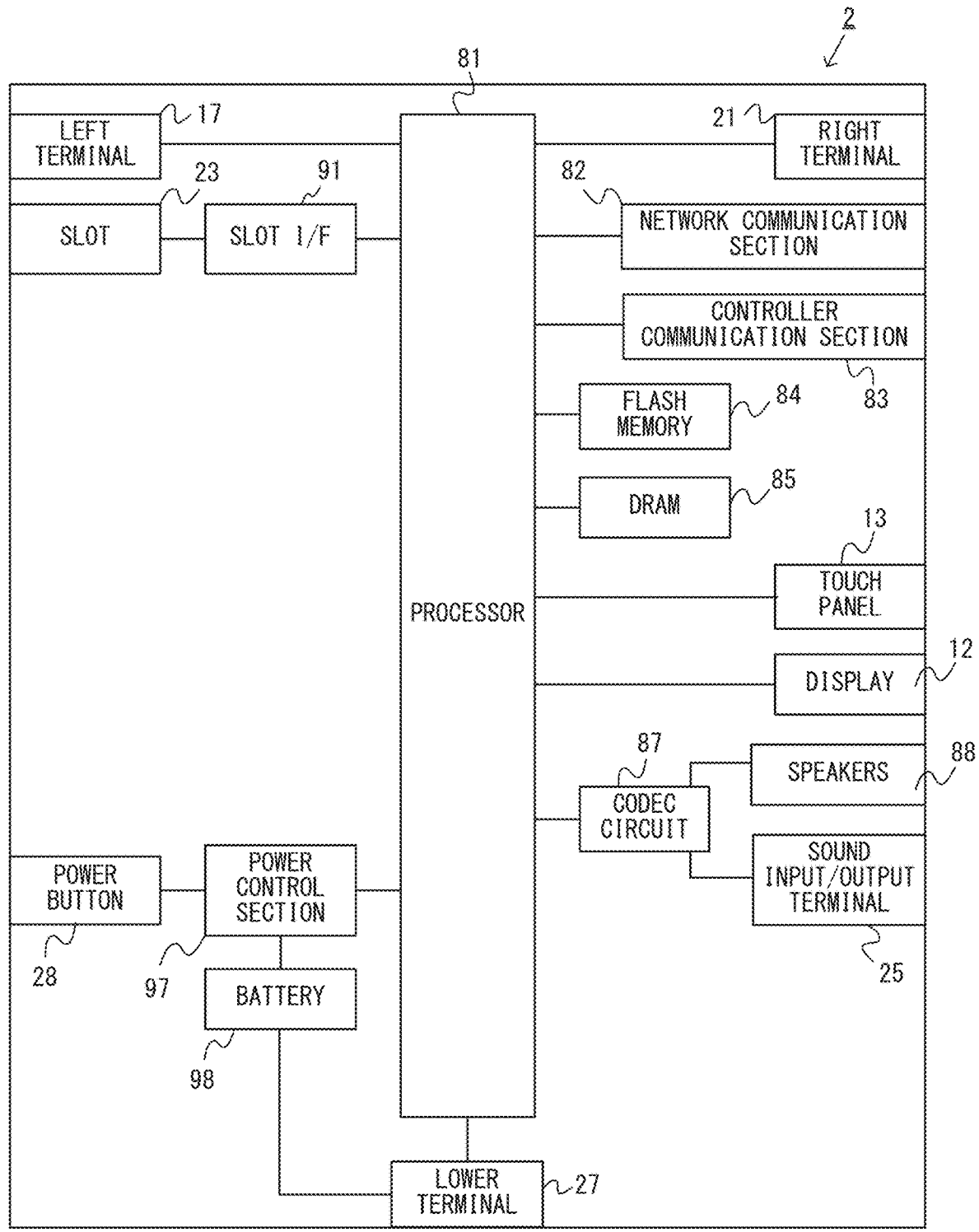
FIG. 6 is a block diagram illustrating a non-limiting example of an internal configuration of the main body apparatus 2.

FIG. 6 is a block diagram illustrating a non-limiting example of an internal configuration of the main body apparatus 2. The main body apparatus 2 includes components 81 to 91, 97, and 98 illustrated in FIG. 6 in addition to the components illustrated in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present non-limiting example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication," in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In the present non-limiting example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in the present non-limiting example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. As a non-limiting example, a first user can provide an input to the main body apparatus 2 using a first set of left and right controllers 3 and 4, and at the same time, a second user can provide an input to the main body apparatus 2 using a second set of left and right controllers 3 and 4.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

The main body apparatus 2 includes a power control section 97 and a battery 98. The power control section 97 is connected to the battery 98 and the processor 81. Further, although not illustrated, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

Figure 7:
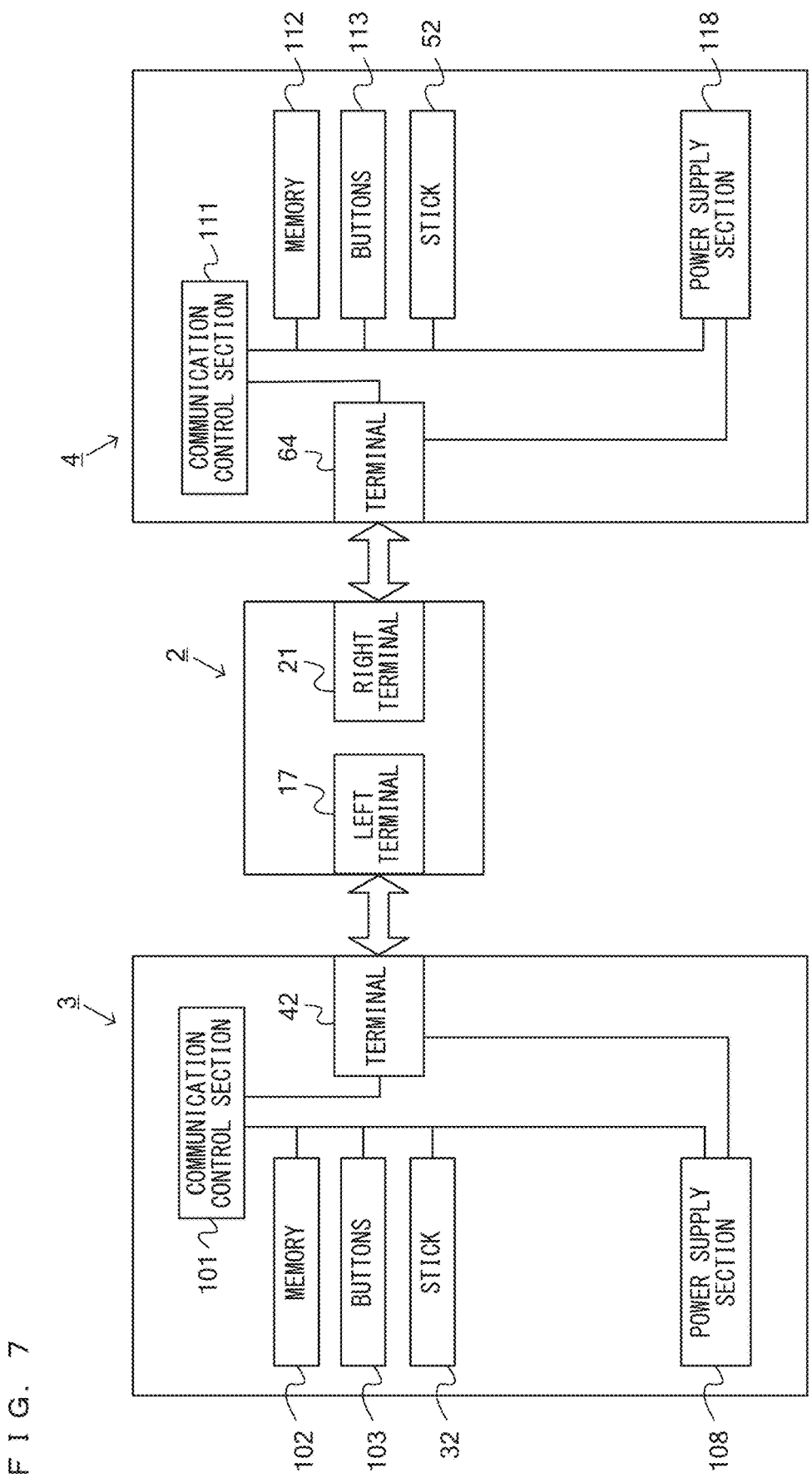
FIG. 7 is a block diagram illustrating examples of internal configurations of the main body apparatus 2, the left controller 3, and the right controller 4.

FIG. 7 is a block diagram illustrating non-limiting examples of the internal configurations of the main body apparatus 2, the left controller 3, and the right controller 4. It should be noted that the details of the internal configuration of the main body apparatus 2 are illustrated in FIG. 6 and therefore are omitted in FIG. 7.

The left controller 3 includes a communication control section 101, which communicates with the main body apparatus 2. As illustrated in FIG. 7, the communication control section 101 is connected to components including the terminal 42. In the present non-limiting example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the present non-limiting example, the power supply section 108 includes a battery and a power control circuit. Although not illustrated in FIG. 7, the power control circuit is connected to the battery and also connected to components of the left controller 3 (specifically, components that receive power supplied from the battery).

As illustrated in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication without via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As described above, in the game system 1 of the present non-limiting example, the left controller 3 and the right controller 4 are removable from the main body apparatus 2. In addition, when the unified apparatus obtained by attaching the left controller 3 and the right controller 4 to the main body apparatus 2 or the main body apparatus 2 alone is attached to the cradle, an image (and sound) can be output on an external display device, such as a stationary monitor or the like. The game system 1 will be described below according to a non-limiting embodiment in which an image is displayed on the display 12.

A game is played using a virtual space displayed on the display 12, according to operations performed on the operation buttons and sticks of the left controller 3 and/or the right controller 4, or touch operations performed on the touch panel 13 of the main body apparatus 2, in the game system 1. In the present non-limiting example, as a non-limiting example, a game can be played using a first player character PC1 and a second player character PC2 and the like in the virtual space, according to the user's operation using the operation buttons and sticks, and the touch panel 13. It should be noted that the first and second player characters PC1 and PC2 in the present non-limiting example serve as a game object appearing in the virtual space. At least one of the player characters may be operated by the user, and at least one of the player characters may not be operated by the user (the latter character is referred to as a "non-player character"). More specifically, it is assumed below that the first player character PC1 is a player character that can be operated by the user, and the second player character PC2 is a non-player character that is automatically controlled by the processor 81. It should be noted that at least one of the first and second player characters PC1 and PC2 corresponds to a non-limiting example of a first and a second game object that are a player object that is operated by the user.

Figure 8:
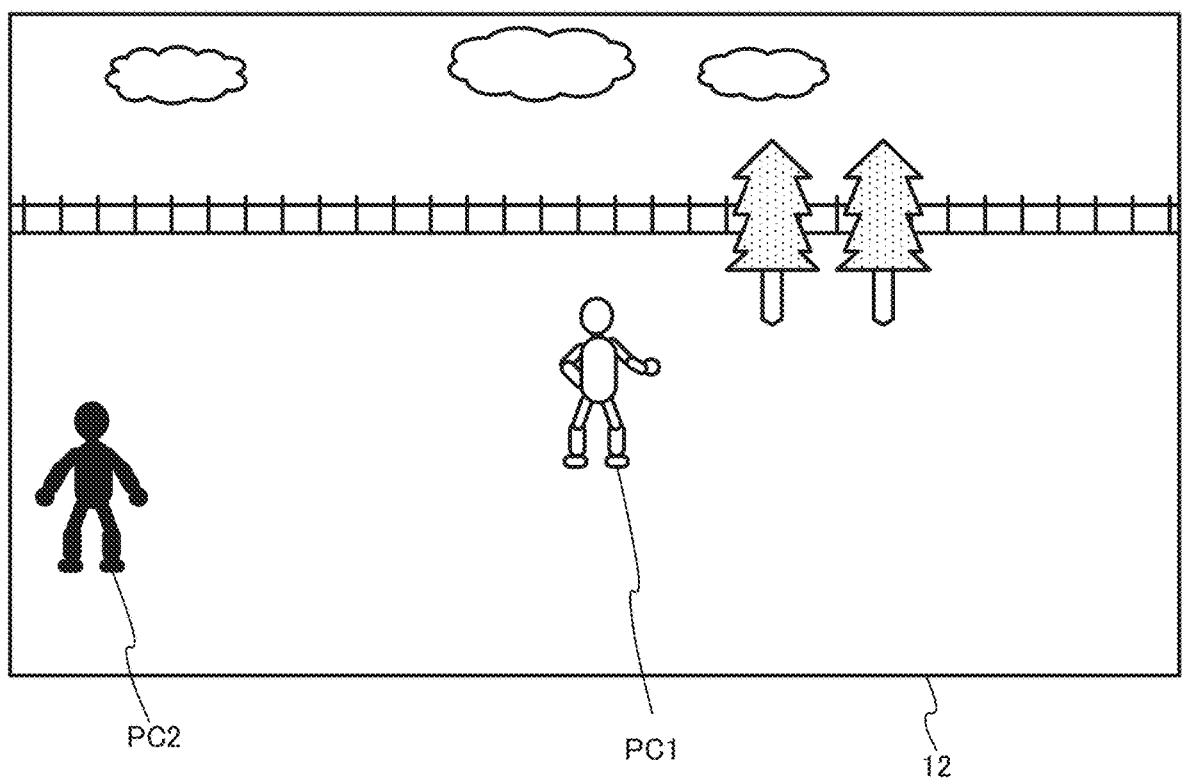
FIG. 8 is a diagram illustrating a non-limiting example of a game image in which a first and a second player character PC1 and PC2 appear.
Figure 9:
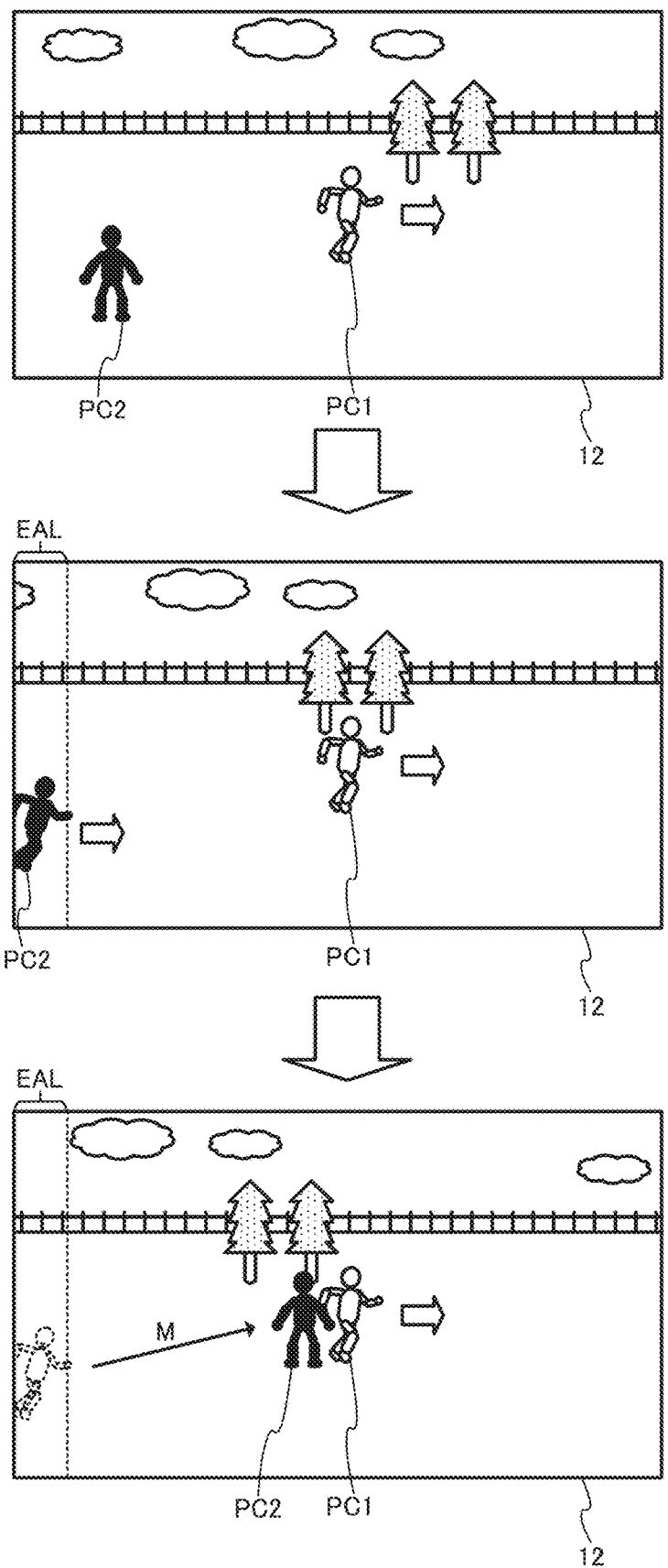
FIG. 9 is a diagram illustrating a non-limiting example of a game image in which a location of the second player character PC2 is changed according to movement of a display range.
Figure 10:
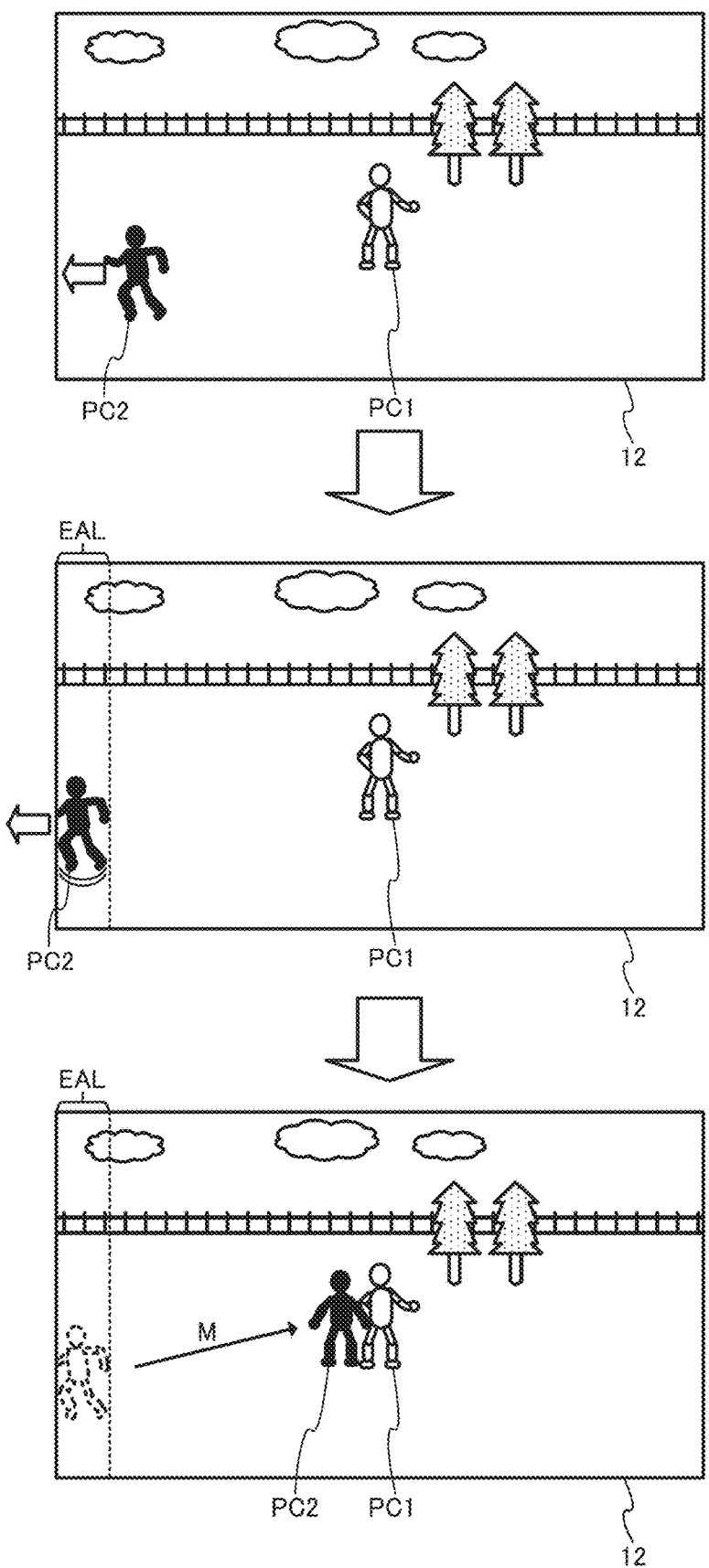
FIG. 10 is a diagram illustrating a non-limiting example of a game image in which a location of the second player character PC2 is changed according to movement of the second player character PC2.
Figure 11:
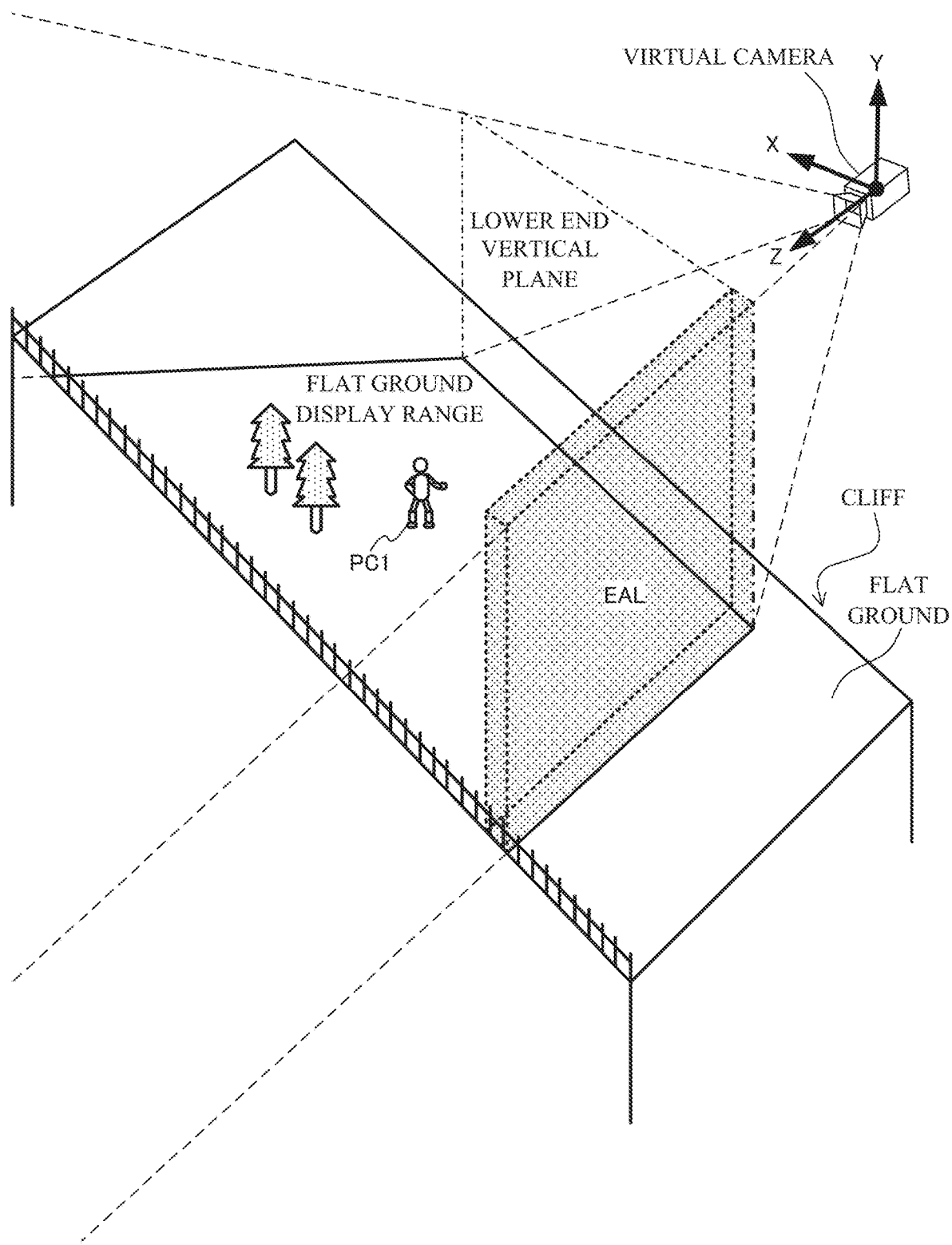
FIG. 11 is a diagram for describing a non-limiting example of a left end range EAL.
Figure 12:
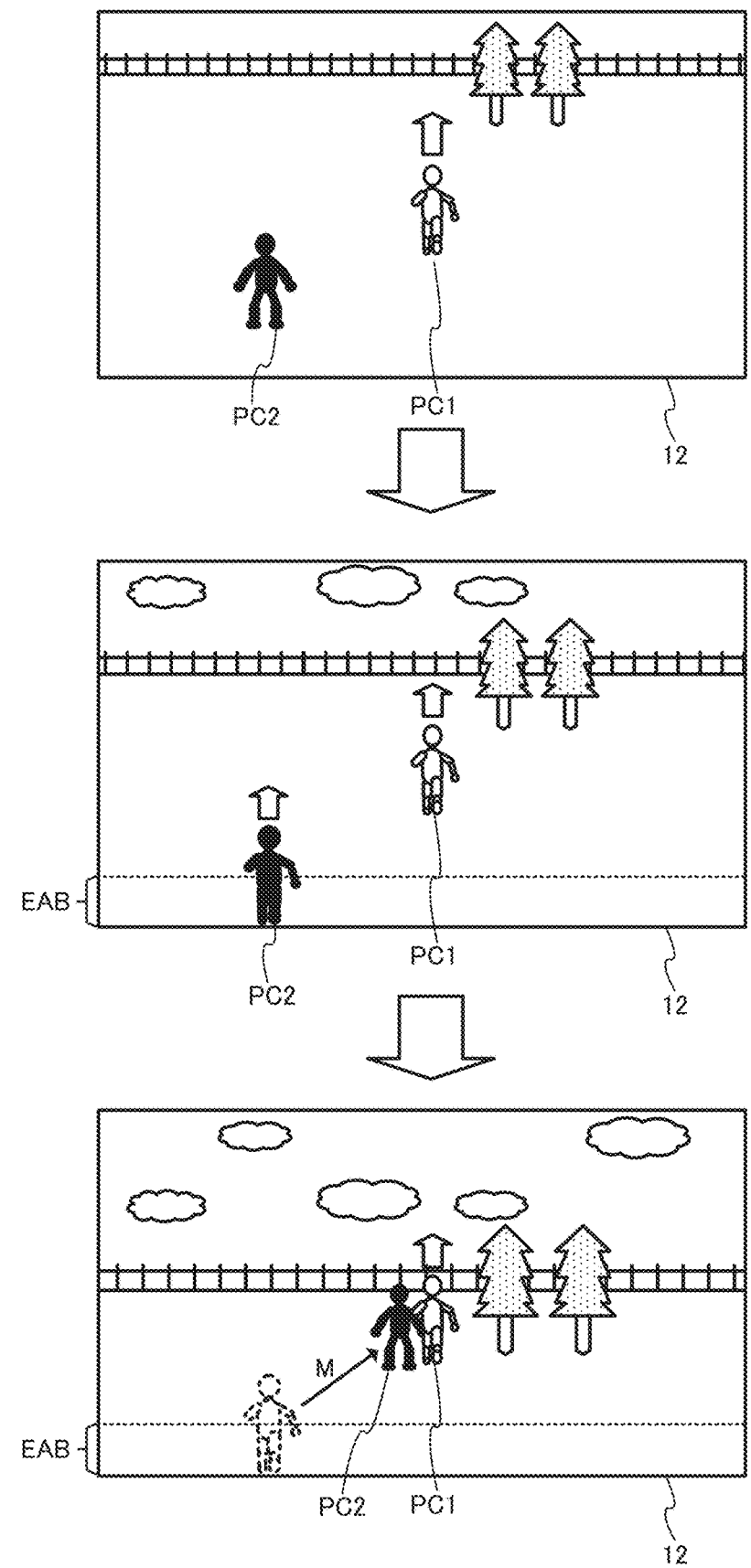
FIG. 12 is a diagram illustrating another non-limiting example of a game image in which a location of the second player character PC2 is changed according to movement of a display range.
Figure 13:
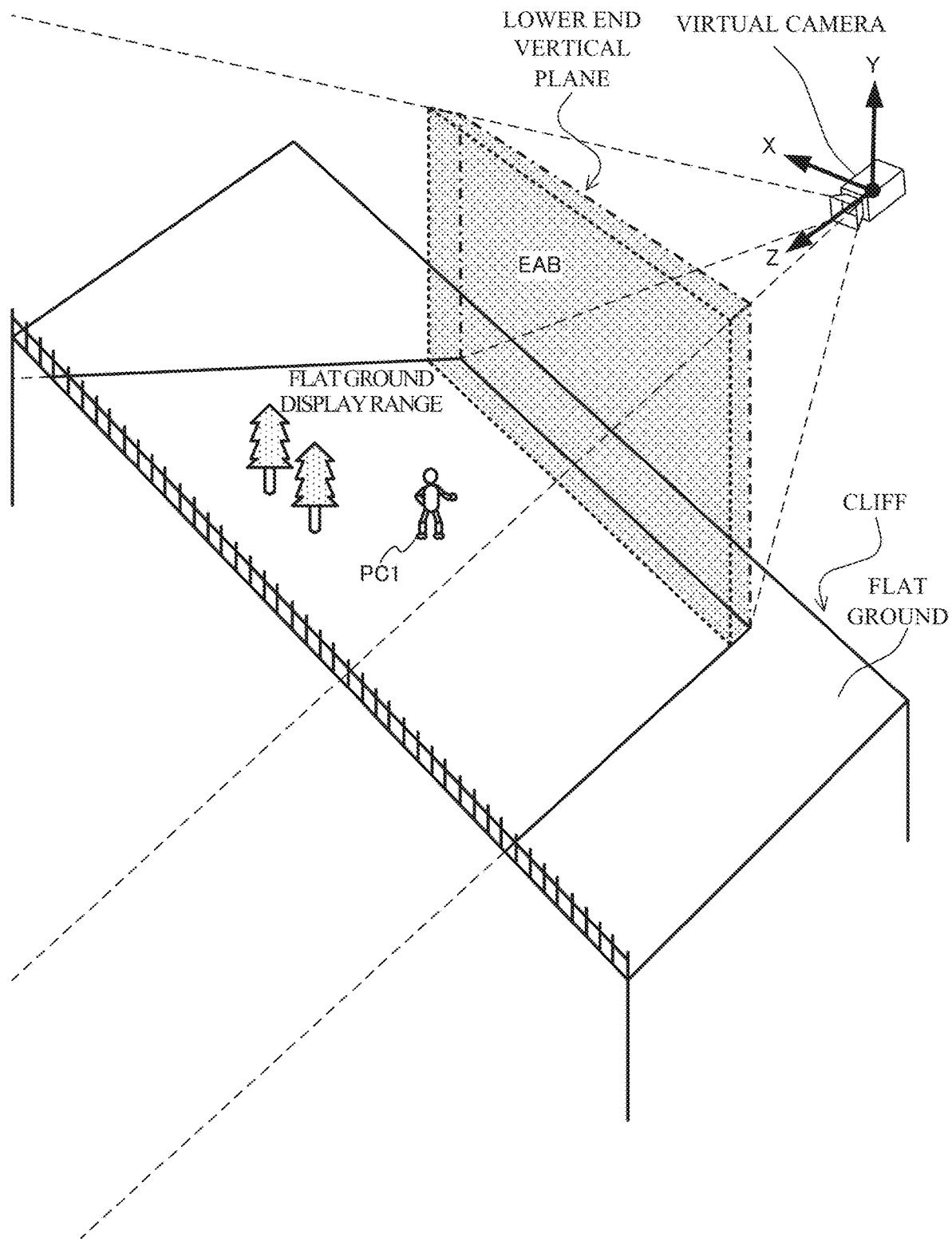
FIG. 13 is a diagram for describing a non-limiting example of a bottom end range EAB.
Figure 14:
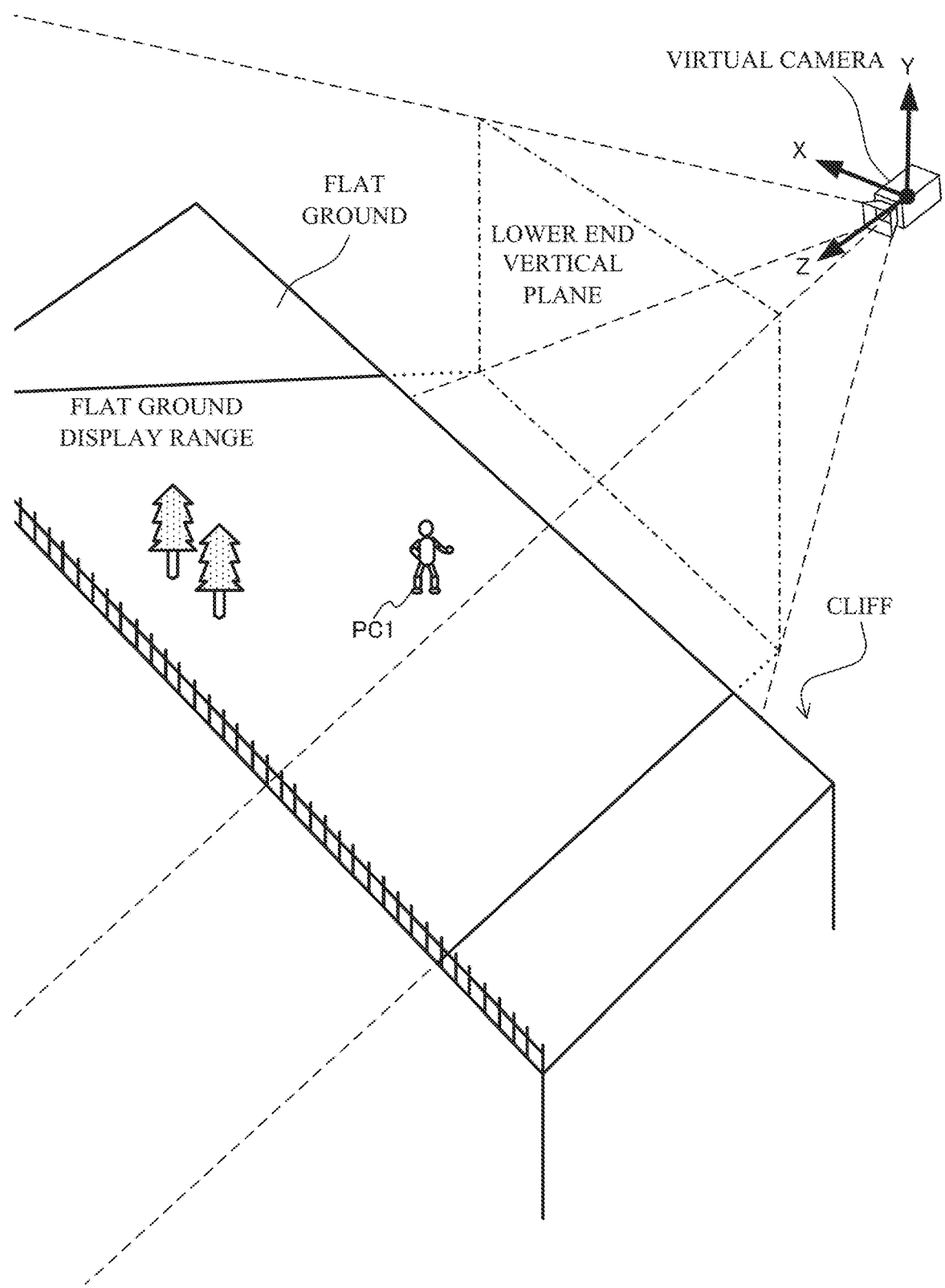
FIG. 14 is a diagram for describing a non-limiting example in which the second player character PC2 is moved out of a display range without end control.

A game process that is performed in the game system 1 will be outlined with reference to FIGS. 8-15. It should be noted that FIG. 8 is a diagram illustrating a non-limiting example of a game image in which the first and second player characters PC1 and PC2 appear. FIG. 9 is a diagram illustrating a non-limiting example of a game image in which a location of the second player character PC2 is changed according to movement of a display range. FIG. 10 is a diagram illustrating a non-limiting example of a game image in which a location of the second player character PC2 is changed according to movement of the second player character PC2. FIG. 11 is a diagram for describing a non-limiting example of a left end range EAL. FIG. 12 is a diagram illustrating another non-limiting example of a game image in which a location of the second player character PC2 is changed according to movement of a display range. FIG. 13 is a diagram for describing a non-limiting example of a bottom end range EAB. FIG. 14 is a diagram for describing a non-limiting example in which the second player character PC2 is moved out of a display range without end control. FIG. 15 is a diagram illustrating a non-limiting example of a game image that is a two-dimensional image in which the first and second player characters PC1 and PC2 appear.

In FIG. 8, a game image in which the first and second player characters PC1 and PC2 are disposed in a virtual space is displayed on the display 12 of the game system 1. It should be noted that in the case where the first and second player characters PC1 and PC2 are operated by different users, as a non-limiting example a first user may perform operation using the game system 1 while a second user may perform operation using another game system that can perform data communication with the game system 1, or alternatively, as another non-limiting example, a first user may perform operation using the left controller 3 of the game system 1 while a second user may perform operation using the right controller 4 of the game system 1.

In the present non-limiting example, as a non-limiting example, a display range of the virtual space displayed on the display 12 of the game system 1 is controlled such that the first player character PC1 is included in a central region of the display range (e.g., a region including a center of the display range). For example, the display 12 of the game system 1 may display an image of the virtual space as viewed from a virtual camera set in the virtual space, and the display range may be the same as the range of view of the virtual camera, or may be a portion of the range of view of the virtual camera.

In the case where such display range control is performed, when the first player character PC1 is moved in the virtual space, the display range may also be moved according to the moved location of the first player character PC1. For example, as illustrated in FIG. 9, when the first player character PC1 is moved to the right as viewed from the virtual camera (the direction indicated by the arrow in the upper diagram of FIG. 9) according to the user's operation, the display range is moved to the right such that the location of the first player character PC1 is centered.

When the display range is moved, the display location of the second player character PC2 may be moved out of the display range. For example, as illustrated in the upper diagram of FIG. 9, when the second player character PC2 is displayed on a left side of the display image on the display 12, then if the display range is moved to the right, the second player character PC2 is moved out of the display range from the left of the display range unless the process of the present non-limiting example is performed. In the present non-limiting example, when the second player character PC2 comes into an end range in the virtual space corresponding to an end portion of the display range due to movement of the display range, end control that causes the second player character PC2 to remain in the end range is performed.

For example, as illustrated in the middle diagram of FIG. 9, when the second player character PC2 comes into the left end range EAL in the virtual space corresponding to a left end portion of the display range due to rightward movement of the display range, end control that causes the second player character PC2 to remain in the left end range EAL is performed. In the end control, the second player character PC2 is controlled to remain in the end range while the display range (range of view) is being moved in a direction that the second player character PC2 would otherwise be moved from the end range into the virtual space out of the display range. Specifically, when the second player character PC2 is located in the left end range EAL, the second player character PC2 is controlled to remain in the left end range EAL while the display range is being moved in a rightward direction in the virtual space corresponding to a direction perpendicular to a left end of the display range and aimed at the inside of the display range. It should be noted that specific locations of end ranges such as the left end range EAL are described below.

In the end control, the second player character PC2 is controlled to remain in an end region of the display screen while the display range is being moved. Therefore, the location of the second player character PC2 is moved in the virtual space as the display range is moved. During the movement of the location, the second player character PC2 is caused to perform an action of moving from an end range toward a location in the virtual space corresponding to a central region of the display range, so that the second player character PC2 is forced to move. It should be noted that the direction in which the second player character PC2 is forced to move as the display range is moved may be a direction in the virtual space that is parallel to the direction in which the display range is moved, a direction toward a location in the virtual space corresponding to a center of the display range (the location of the first player character PC1), or a direction in which the distance by which the second player character PC2 is forced to move is minimum. The action of the second player character PC2 may be running, walking, jumping, flying, moving with the help of wheels or a propulsion device, or the like. Thus, instead of action control that causes the second player character PC2 to be pressed against a wall in a static state, the second player character PC2 is forced to move while the second player character PC2 is caused to perform an action of moving toward a location in the virtual space corresponding to a central region of the display range during the end control. As a result, the second player character PC2 looks like moving on its own, and therefore, a natural movement can be expressed.

If the end control has continued for at least a predetermined waiting period (e.g., 1 second), the second player character PC2 is moved to a location other than the end range in the range of the virtual space corresponding to the display range of the display 12. As a non-limiting example, as illustrated by the arrow M in the lower diagram of FIG. 9, if the end control has continued for at least the waiting period, the second player character PC2 is moved to a location in the vicinity of the first player character PC1. As another non-limiting example, if the end control has continued for at least the waiting period, the second player character PC2 is moved to a location in the virtual space corresponding to a central region of the display range. Here, the central region is a region inside the display range, excluding the end range, and including at least a center of the display range. An operation of causing the second player character PC2 to move to a location other than the end range may result in instantaneous movement of the second player character PC2, or movement of the second player character PC2 that consumes a predetermined period of time with a predetermined action being performed (e.g., a warp drive action in the virtual space). It should be noted that even if the state in which the display range is not being moved and the second player character PC2 is disposed in the end range in a static state (i.e., the virtual camera is at rest and the second player character PC2 is not performing any action) has continued for at least the waiting period, the end control is not performed, and therefore, the process of moving the second player character PC2 to a location other than the end range is not performed.

Although in the foregoing, the display range is, for example, moved according to movement of the first player character PC1 in the virtual space, the display range may be changed according to other actions of the first player character PC1 or other range-of-view control of the virtual camera. As a non-limiting example, the display range may be enlarged and reduced according to the size of the first player character PC1, or alternatively, the display range may be changed according to a state (e.g., a specific state such as attacking, defending, or performing a special action) of the first player character PC1. Alternatively, the display range may be moved due to movement and/or rotation of the virtual camera according to movement of the first player character PC1, or the display range may be changed according to zooming-in and zooming-out of the virtual camera.

Although in the foregoing, the display range is, for example, moved according to movement of the first player character PC1 in the virtual space, the display range may be moved irrespective of the location of the first player character PC1. As a non-limiting example, the location and/or orientation of the virtual camera, which controls the display range, may be changed according to the user's operation. As another non-limiting example, the location and/or orientation of the virtual camera, which controls the display range, may be changed according to a predetermined algorithm (e.g., an algorithm that causes the virtual camera to move or rotate at a constant speed). In any of these cases, the first player character PC1 may not be disposed in the display range, and if the conditions for the end control are satisfied by the second player character PC2, similar control is performed. In addition, in these cases, the conditions for the end control may be satisfied by the first player character PC1. Even if the first player character PC1 satisfies the conditions for the end control, control similar to that for the second player character PC2 may be performed. Alternatively, even in the case where both of the first and second player characters PC1 and PC2 are a player character that is operated by the user, similar control may be performed as the display range is moved.

As another non-limiting example, the second player character PC2 may be moved in the virtual space such that the display location of the second player character PC2 is moved out of the display range of the display 12. For example, as illustrated in the upper diagram of FIG. 10, in a state that the second player character PC2 is displayed on a left side of a display image on the display 12, when the second player character PC2 is moved to the left as viewed from the virtual camera (in the direction indicated by the arrow in the upper diagram of FIG. 10), the second player character PC2 is moved out of the display range from the left of the display range unless the process of the present non-limiting example is performed. In the present non-limiting example, when the second player character PC2 performs an action of moving in a direction toward a location in the virtual space corresponding to a location out of the display range from the end range in the virtual space corresponding to an end portion of the display range is performed, end control that causes the second player character PC2 to remain in the end range is performed.

For example, as illustrated in the middle diagram of FIG. 10, when the second player character PC2 is moved to the left as viewed from the virtual camera to come into the left end range EAL in the virtual space corresponding to a left end portion of the display range, end control that causes the second player character PC2 to remain in the left end range EAL is performed. In the end control, the second player character PC2 is controlled to remain in the end range while the second player character PC2 is performing an action of moving, from the end range, in a direction toward a location in the virtual space corresponding to a location out of the display range. Specifically, the second player character PC2 is controlled to remain in the left end range EAL while the second player character PC2 is performing an action of moving leftward in the virtual space corresponding to a direction perpendicular to a left end of the display range and aimed at the outside of the display range (an action to try to move leftward in the virtual space).

In the end control, while the second player character PC2 is performing an action to try to move out of the display range in the virtual space, the second player character PC2 is controlled such that the location of the second player character PC2 is not moved out of the end range. It should be noted that when the second player character PC2 is caused to remain in the end range, the location of the second player character PC2 as it was at the start of the end control may be maintained, or the second player character PC2 may be moved in the end range. The action of the second player character PC2 performed when the second player character PC2 remains in the end range may be stepping, scratching a foot, being pushed back into the end range, striking a boundary with the outside of the display range, and being pulled in a direction opposite to the direction in which the second player character PC2 is trying to move, which actions are performed by the second player character PC2 in the end range.

Even if the end control, which is based on movement of the second player character PC2, has continued for at least a predetermined waiting period (e.g., 1 second), the second player character PC2 is moved to a location other than the end range of the range in the virtual space corresponding to the display range of the display 12. As a non-limiting example, as indicated by the arrow M in the lower diagram of FIG. 10, if the end control, which is based on movement of the second player character PC2, has continued for at least a predetermined waiting period, the second player character PC2 is moved to a location in the vicinity of the first player character PC1. As another non-limiting example, if the end control, which is based on movement of the second player character PC2, has continued for at least a predetermined waiting period, the second player character PC2 is moved to a location in the virtual space corresponding to a central region of the display range (e.g., a region including a center of the display screen). An operation of causing the second player character PC2 to move to a location other than the end range may result in instantaneous movement of the second player character PC2, or movement of the second player character PC2 that consumes a predetermined period of time with a predetermined action being performed by the second player character PC2, as in the end control based on movement of the display range. It should be noted that even if the state in which the second player character PC2 has been moved into the end range from a location other than the end range in the range in the virtual space corresponding to the display range, and is at rest, has continued for at least the waiting period, the end control is not performed, and therefore, the process of moving the second player character PC2 to a location other than the end range is not performed.

Although in the foregoing, the control is, for example, based on movement of the second player character PC2, similar control may be performed even when the first player character PC1 performs an action to try to move into a virtual space out of the display range. Alternatively, even in the case where both of the first and second player characters PC1 and PC2 are a player character that is operated by the user, similar control may be performed as the characters are moved.

Next, a specific example of the left end range EAL will be described with reference to FIG. 11. In FIG. 11, four dashed lines of a rectangular pyramid indicate a view volume of the virtual camera, and the first player character PC1 that is disposed on a flat ground of a game field is disposed in a range of view of the virtual camera. In the game field, a cliff at which the height of the flat ground changes suddenly is formed in front of the virtual camera, and is out of the range of view of the virtual camera. It should be noted that in the non-limiting example of FIG. 11, the virtual space in the range of view of the virtual camera is the display range of a display image displayed on the display 12, and the display range corresponds to the range of view of the virtual camera for the sake of simplicity.

The left end range EAL is set as a range in the display range of the virtual space corresponding to a left end of a display image displayed on the display 12. In other words, the left end range EAL is set as a space that is a predetermined left portion (e.g., 10%) of the view volume of the virtual camera as viewed from the virtual camera. Therefore, as indicated by the hatched region in FIG. 11, the left end range EAL includes not only points on the flat ground corresponding to a left end of the display range of the display image on the display 12, but also a space extending from the flat ground in the depth direction and the vertical direction of the virtual space. Therefore, in the end control, not only a player character is caused to remain at points on the flat ground, but also a player character may be caused to move to and remain at locations in the depth direction from the flat ground in the virtual space corresponding to the left end of the display image, or locations in the vertical direction of the virtual space. In addition, the end control is performed not only when a player character is disposed on the flat ground, but also when a player character is disposed in a space on the flat ground corresponding to a left end of the display image.

The left end range EAL is formed in a range in the virtual space in which a player character can be moved. Therefore, even in the non-limiting example of FIG. 11, the left end range EAL may not be formed in the earth under the flat ground, in which a player character cannot be moved, or in a space behind a deep end of the flat ground, on and above which a player character can be moved (the space is farther away from the virtual camera than is the flat ground).

In addition, in the present non-limiting example, even in a range in which a player character can be moved, the left end range EAL may not be formed in a space closer to the virtual camera than is a bottom end vertical plane. The bottom end vertical plane is a virtual end plane that includes a location in the virtual space corresponding to a bottom end of a display image on the display 12, and is formed in a vertical direction in the virtual space. More specifically, the bottom end vertical plane is formed as a vertical plane in the virtual space that includes a line segment that is an intersection of a horizontal plane in the virtual space (the flat ground in the non-limiting example of FIG. 11) on which the first player character PC1 is located and a plane in the virtual space corresponding to a bottom end of a display image on the display 12 (i.e., a bottom end of the view volume of the virtual camera). Therefore, in the end control, by prohibiting a player character to move into a space closer to the virtual camera than is the bottom end vertical plane, a player character is not allowed to move very close to the virtual camera.

In the present non-limiting example, the end range includes not only the left end range EAL at a left end of a display image displayed on the display 12, but also a right end range EAR at a right end of the display image along a right end of the view volume of the virtual camera. The right end range EAR is similar to the left end range EAL, and similar end control is performed on the right end range EAR.

In the present non-limiting example, the bottom end range EAB is also set at a bottom end of a display image displayed on the display 12. The bottom end range EAB is used to perform end control similar to that which is performed in the left end range EAL. A non-limiting example of end control using the bottom end range EAB and a specific non-limiting example of the bottom end range EAB will be described below with reference to FIGS. 12 and 13.

In the description of the end control using the bottom end range EAB, a non-limiting example is used in which the display range of the virtual space displayed on the display 12 of the game system 1 is controlled such that the first player character PC1 is included in a central region of the display range (e.g., a region including a center of the display range). For example, as illustrated in FIG. 12, when the first player character PC1 is moved deep as viewed from the virtual camera (in a direction away from the virtual camera; the direction indicated by the arrow in the upper diagram of FIG. 12) according to the user's operation, the display range is also moved deep in the virtual space such that the location of the first player character PC1 is centered.

When the display range is moved, the display location of the second player character PC2 may be moved out of the display range from the bottom end of the display screen. For example, as illustrated in the upper diagram of FIG. 12, when the second player character PC2 is displayed on a lower side of a display image on the display 12, then if the display range is moved deep, the second player character PC2 may be moved out of the display range from a bottom end of the display range unless the process of the present non-limiting example is performed. In the present non-limiting example, even if the second player character PC2 is located in an end range of the virtual space corresponding to a bottom end portion of the display range due to movement of the display range, end control that causes the second player character PC2 to remain in the end range is performed.

For example, as illustrated in the middle diagram of FIG. 12, if the second player character PC2 is located in the bottom end range EAB of the virtual space corresponding to a bottom end portion of the display range due to deep movement of the display range, end control that causes the second player character PC2 to remain in the bottom end range EAB is performed as in the left end range EAL. For example, if the second player character PC2 is located in the bottom end range EAB, the second player character PC2 is controlled to remain in the bottom end range EAB while the display range is being moved in a depth direction of the virtual space corresponding to a direction perpendicular to the bottom end of the display range and aimed at the inside of the display range. It should be noted that specific locations of end ranges such as the bottom end range EAB are described below.

Also in the end control using the bottom end range EAB, the second player character PC2 is controlled to remain in an end region of the display screen while the display range is being moved, and therefore, the location of the second player character PC2 is moved in the virtual space as the display range is moved. During the movement of the location, the second player character PC2 is caused to perform an action of moving from the end range toward a location in the virtual space corresponding to a central region of the display range, so that the second player character PC2 is forced to move.

If the end control using the bottom end range EAB has continued for at least a predetermined waiting period (e.g., 1 second), the second player character PC2 is moved to a location other than the end range in the range of the virtual space corresponding to the display range of the display 12. As a non-limiting example, as illustrated by the arrow M in the lower diagram of FIG. 12, if the end control has continued for at least the waiting period, the second player character PC2 is moved to a location in the vicinity of the first player character PC1. As another non-limiting example, if the end control has continued for at least the waiting period, the second player character PC2 is moved to a location in the virtual space corresponding to a central region of the display range.

As another non-limiting example, the second player character PC2 may be moved in the virtual space such that the display location of the second player character PC2 is moved out of the display range of the display 12 from the bottom end of the display 12. Even in such a case, as with the end control using the left end range EAL, when the second player character PC2 performs an action of moving from the bottom end range EAB in a direction toward a location in the virtual space corresponding to a location out of the display range, end control that causes the second player character PC2 to remain in the end range is performed. In addition, if the end control using the bottom end range EAB, which is based on movement of the second player character PC2, has continued for at least a predetermined waiting period (e.g., 1 second), the second player character PC2 is moved to a location other than the end range (e.g., a location in the vicinity of the first player character PC1) in the range of the virtual space corresponding to the display range of the display 12.

In FIG. 13, a virtual space similar to the game field illustrated in FIG. 11 is set in the range of view of the virtual camera. The bottom end range EAB is set in a range included in the display range of the virtual space with reference to a bottom end of a display image displayed on the display 12. Specifically, the bottom end range EAB is set as a space in the view volume of the virtual camera, extending by a predetermined distance away from the bottom end vertical plane as viewed from the virtual camera. As indicated by the hatched region in FIG. 13, the bottom end range EAB includes not only points on the flat ground corresponding to a bottom end of a display range of a display image on the display 12, but also a space extending from the flat ground in the horizontal direction and the vertical direction of the virtual space. Therefore, in the end control, not only a player character is caused to remain at points on the flat ground, but also a player character may be caused to move to and remain at locations in the horizontal direction from the flat ground in the virtual space corresponding to the bottom end of the display image or locations in the vertical direction of the virtual space. In addition, the end control is performed not only when a player character is disposed on the flat ground, but also when a player character is disposed in a space on the flat ground corresponding to a bottom end of the display image.

Specifically, when the virtual camera is moved deep in the virtual space, so that the display range is moved deep and therefore a player character is located in the bottom end range EAB, end control that causes the player character to remain in the bottom end range EAB is performed. In the end control, the player character is controlled to remain in the bottom end range EAB while the display range (range of view) is being moved in the depth direction. When a player character is moved toward the virtual camera to be located in the bottom end range EAB, end control that causes the player character to remain in the bottom end range EAB is performed. In the end control, the player character is controlled to remain in the bottom end range EAB while the player character is performing an action of moving from the bottom end range EAB toward the virtual camera. In both of these types of end control, if the end control has continued for at least the waiting period, a player character is forced to move to a location in the virtual space corresponding to a central region of the display range.

It should be noted that in a game in which when a player character is moved deep away from the virtual camera, the virtual camera is also moved deep, following the player character, and as a result, the virtual space is scrolled from a deep position toward the virtual camera, the end control using the bottom end range EAB, which is based on scrolling of the virtual space, is effectively performed.

Here, as can be seen from FIG. 13, the bottom end range EAB is formed along a vertical plane extending in all directions as viewed from the virtual camera with reference to a bottom end of a display image displayed on the display 12, and therefore, is formed throughout the display region. Therefore, even in the case where a player character is floating in a space above the bottom end region, i.e., a space above the flat ground, the end control is performed. Therefore, the end control using the bottom end range EAB is performed on a player character even in when the player character is not displayed at the bottom end of the display image.

Thus, the bottom end range EAB is formed along a vertical plane in the virtual space, and therefore, the end control using the bottom end range EAB can prevent a player character remaining in the bottom end range EAB on the flat ground from being moved out from the bottom end of the display screen. In addition, even when a player character is moved so as to fall down from the air in the virtual space to the game field (flat ground) in the bottom end range EAB, a natural movement can be expressed. In the case where such an effect is not expected, the bottom end range EAB may be formed along a bottom end surface of the view volume of the virtual camera. In that case, the bottom end range EAB is formed as an inclined space that is inclined with respect to the virtual space from the point of view of the virtual camera. Therefore, a player character remaining in the bottom end range EAB can be moved very close to the virtual camera. In addition, when a player character is moved so as to fall down in the bottom end range EAB from the air in the virtual space, the player character falls along the inclined space. If a game employs a virtual space in which such a motion is not unnatural, the bottom end range EAB that is inclined with respect to the vertical direction may be formed.

In the present non-limiting example, for example, in the case where the angle of depression of the virtual camera is so great that the flat ground is displayed throughout the range of view (up to the top end of the display image), or where the flat ground is extended very far in the depth direction of the virtual camera, a top end range EAT corresponding to a range in the virtual space corresponding to a top end of the display image may be set, and end control similar to those for the other end ranges may be performed. However, in the case of the display image illustrated in FIG. 8, the end control for a top end of a display image displayed on the display 12 may not be performed. In that case, a player character may be prevented from being moved out of the display range, by setting a limit on how much distance a player character can be moved upward from the flat ground.

It should be noted that a process of forcing a player character to move may be performed according to how much distance the player character has been moved away from the virtual camera. For example, when the second player character PC2 is moved away from the virtual camera in the virtual space to a location that is at least a threshold distance away from the virtual camera or the first player character PC1, the second player character PC2 may be forced to move closer to the virtual camera or the first player character PC1 than the threshold. It should be noted that the timing that the forced movement is started may be the end of the waiting period that has passed since the second player character PC2 arrived at the location that is at least the threshold distance away from the virtual camera or the first player character PC1, or may be the time of the arrival of the second player character PC2 at the location.

It should be noted that in the present non-limiting example, a player character may be moved into a range in the virtual space out of the display range without the end control. In that case, a process of forcing the player character to move into a range in the virtual space corresponding to a portion in the display range is performed, which is triggered by control different from the end control. For example, a game field in which a player character can be moved may be formed in a range in the virtual space corresponding to a portion out of a display range of a display image displayed on the display 12, but not in the left end range EAL, the right end range EAR, or the bottom end range EAB, in which end control is performed.

For example, as illustrated in FIG. 14, a case will be discussed where a cliff at which the height of the flat ground changes suddenly is displayed at a bottom end of a display image displayed on the display 12. In this case, a bottom end vertical plane is formed as a vertical plane in the virtual space that includes a line segment that is an intersection of a horizontal plane in the virtual space (the flat ground and a plane obtained by extending the flat ground from the cliff in the non-limiting example of FIG. 14) on which the first player character PC1 is located and a plane in the virtual space corresponding to the bottom end of the display image on the display 12 (i.e., the bottom end of the view volume of the virtual camera). Therefore, the bottom end vertical plane is formed at a location away from the flat ground and closer to the virtual camera, and therefore, the bottom end range EAB (see FIG. 11), which is formed along the bottom end vertical plane, may also be formed at a location away from the flat ground. In this case, a space (gap) into which a player character may fall from a cliff top may be formed between the flat ground and the bottom end range EAB. When a player character performs an action of falling from the flat ground toward the bottom of the cliff through the space, the player character can be moved from the bottom end of the display image to a location in the virtual space corresponding to a location out of the display range without reaching the inside of the bottom end range EAB.

In the present non-limiting example, when a player character falls from a cliff top described above, the player character is forced to move to a location in the virtual space corresponding to a location in the display range immediately after the player character has reached a location in the virtual space corresponding to a location out of the display range, or the player character is forced by a predetermined process to move to a location in the virtual space corresponding to a location in the display range after the player character has reached a location in the virtual space corresponding to a location out of the display range. In the former case, for example, in the case where a ground is formed at the bottom of the cliff and the player character is not given a penalty, the forced movement may be performed immediately after the player character has reached a location in the virtual space corresponding to a location out of the display range. In the latter case, for example, in the case where there is a hell at the bottom of the cliff, the predetermined process is a process of giving a penalty to the player character, and the forced movement may be performed after the result of the process is reported.

It should be noted that an example that a player character falls from a cliff top has been described as a non-limiting example that a player character is moved into a range in the virtual space corresponding to a portion out of the display range without the end control. In another non-limiting embodiment, even when a player character is moved into a range in the virtual space corresponding to a portion out of the display range, the player character may be forced to move to a location in the virtual space corresponding to a location in the display range. For example, in the case where there is an end portion of the display range in which the end range is not provided and the end control is not performed, when a player character is moved out of the display range from the end portion, the end control is not performed. In such a case, a player character may be forced to move to a location in the virtual space corresponding to a location in the display range immediately after the player character is moved out of the display range.

This non-limiting example is also preferable for games using a two-dimensional game world. For example, FIG. 15 illustrates a game that proceeds while a game world displayed on the display 12 is scrolled leftward, and in which the first and second player characters PC1 and PC2 are moved rightward in the game world. In a game in which such a two-dimensional game world is displayed, a left end region ERL is set in the game world, corresponding to a left end of a display range of a display image displayed on the display 12, a right end region ERR is set in the game world, corresponding to a right end of the display range, a top end region ERT is set in the game world, corresponding to a top end of the display range, and a bottom end region ERB is set in the game world, corresponding to a bottom end of the display range.

When the game world is laterally scrolled leftward, so that any of the first player character PC1 and/or the second player character PC2 is located in the left end region ERL, end control that causes the first player character PC1 and/or the second player character PC2 to remain in the left end region ERL is performed. In the end control, the first player character PC1 and/or the second player character PC2 are controlled to remain in the left end region ERL while the game world is being laterally scrolled such that the first player character PC1 and/or the second player character PC2 are moved out of the display range from the left end region ERL. When the first player character PC1 and/or the second player character PC2 are moved to be located in the left end region ERL, the right end region ERR, the top end region ERT, or the bottom end region ERB, end control that causes the first player character PC1 and/or the second player character PC2 to remain in that end region is performed. In the end control, while the first player character PC1 and/or the second player character PC2 are performing an action of moving a portion of the game world out of the display range from an end region, the first player character PC1 and/or the second player character PC2 are controlled to remain in the end region. In all of these types of end control, when the end control has continued for at least the waiting period, the first player character PC1 and/or the second player character PC2 are forced to move to a location in the game world corresponding to a location in the display range other than the end regions.

As described above, in a two-dimensional game in which the game world is forced to scroll leftward irrespective of the presence or absence of movement of a player character, or the game world is laterally scrolled leftward with respect to the display 12 according to movement of a player character from left to right, only the left end region ERL is used in end control which is based on movement of the display range, and is effectively used in such a lateral-scroll game. In other words, in such a two-dimensional scroll game, an end region for performing end control may be provided only at an end portion of the display range on the side that the game world is scrolled (in the non-limiting example of FIG. 15, the left end region ERL that is formed at a left end portion of the display range).

Figure 16:
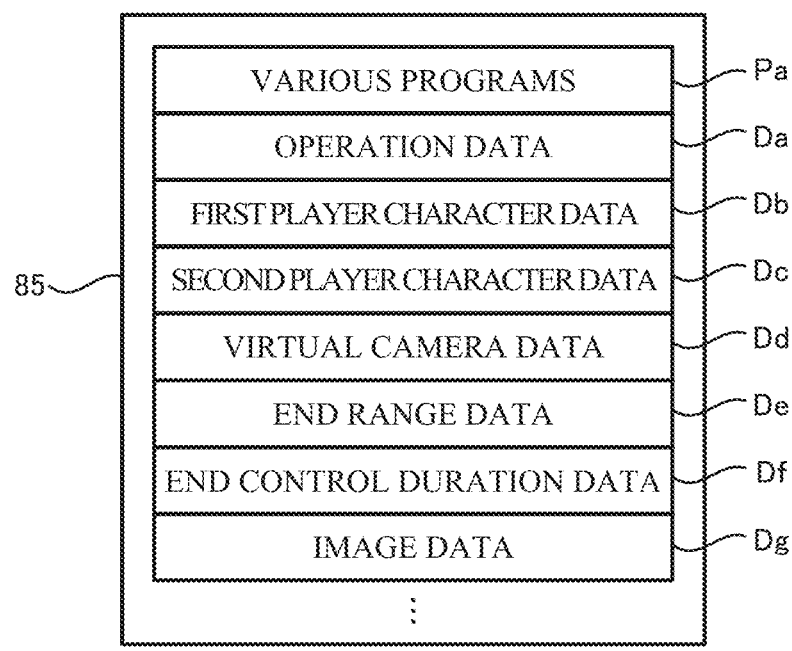
FIG. 16 is a diagram illustrating a non-limiting example of a data area contained in a DRAM 85 of a main body apparatus 2 in the present non-limiting example.

Next, a non-limiting example of a specific process that is executed by the game system 1 in the present non-limiting example will be described with reference to FIGS. 16-18. FIG. 16 is a diagram illustrating a non-limiting example of a data area contained in the DRAM 85 of the main body apparatus 2 in the present non-limiting example. It should be noted that in addition to the data of FIG. 16, the DRAM 85 also stores data that is used in other processes, which will not be described in detail.

Various programs Pa that are executed in the game system 1 are stored in a program storage area of the DRAM 85. In the present non-limiting example, the programs Pa include an application program (e.g., a game program) for performing information processing based on data obtained from the left controller 3 and/or the right controller 4, and the main body apparatus 2. It should be noted that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

Various kinds of data that are used in processes such as an information process that are executed in the game system 1 are stored in a data storage area of the DRAM 85. In the present non-limiting example, the DRAM 85 stores operation data Da, first player character data Db, second player character data Dc, virtual camera data Dd, end range data De, end control duration data Df, and image data Dg, and the like.

The operation data Da is obtained, as appropriate, from each of the left controller 3 and/or the right controller 4 and the main body apparatus 2. As described above, the operation data obtained from each of the left controller 3 and/or the right controller 4 and the main body apparatus 2 includes information about an input from each input section (specifically, each button, an analog stick, or a touch panel) (specifically, information about an operation). In the present non-limiting example, operation data is obtained from each of the left controller 3 and/or the right controller 4 and the main body apparatus 2. The obtained operation data is used to update the operation data Da as appropriate. It should be noted that the operation data Da may be updated for each frame that is the cycle of a process executed in the game system 1, or may be updated each time operation data is obtained.

The first player character data Db is for indicating a location, orientation, action, state, and the like in the virtual space of the first player character PC1 when disposed in the virtual space. The second player character data Dc is for indicating a location, orientation, action, state, and the like in the virtual space of the second player character PC2 when disposed in the virtual space.

The virtual camera data Dd is for indicating a location, orientation, and the like of the virtual camera disposed in the virtual space.

The end range data De is for indicating a location of each end range in the virtual space set based on a display range of a display image displayed on the display 12.

The end control duration data Df is for indicating a duration that end control is continued.

The image data Dg is for displaying an image (e.g., an image of the first player character PC1, an image of the second player character PC2, images of other virtual objects, an image of the virtual space, a background image, etc.) on a display screen (e.g., the display 12 of the main body apparatus 2).

Next, a specific non-limiting example of a game process in the present non-limiting example will be described with reference to FIGS. 17 and 18. It should be noted that in order to provide a specific description of the game process, it is, for example, assumed that the second player character PC2, of the first and second player characters PC1 and PC2, which appear in the virtual space, is a non-player character that is to be subjected to an end portion process. FIG. 17 is a flowchart illustrating a non-limiting example of a game process that is executed in the game system 1. FIG. 18 is a subroutine illustrating a specific non-limiting example of an end control process that is performed in step S128 of FIG. 17. In the present non-limiting example, a series of processes illustrated in FIGS. 17 and 18 are performed by the processor 81 executing a predetermined application program (game program) included in the programs Pa. The information process of FIGS. 17 and 18 is started with any suitable timing.

Figure 17:
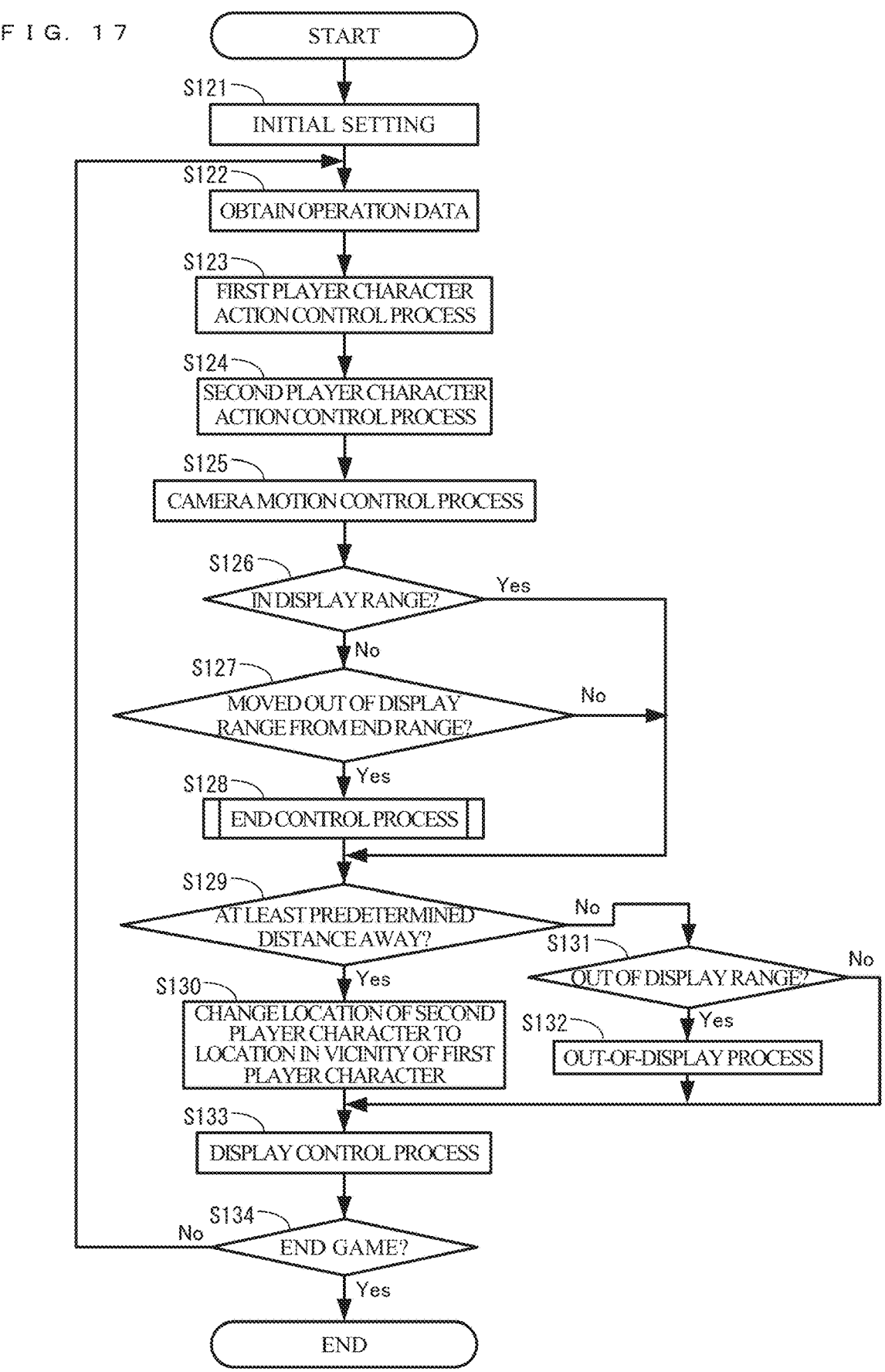
FIG. 17 is a flowchart illustrating a non-limiting example of a game process that is executed in a game system 1.
Figure 18:
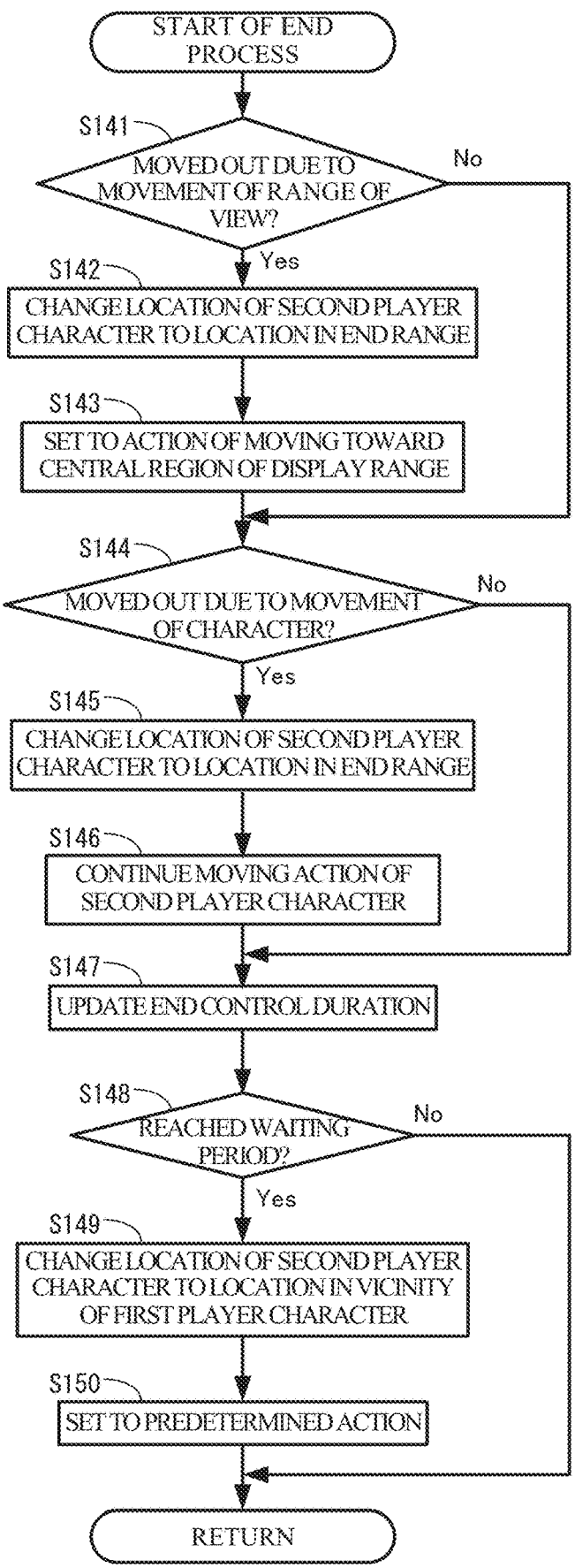
FIG. 18 is a subroutine illustrating a specific non-limiting example of an end control process that is performed in step S128 of FIG. 17.

It should be noted that the steps in the flowchart of FIGS. 17 and 18, which are merely illustrative, may be executed in a different order, or another step may be executed in addition to (or instead of) each step, if a similar effect is obtained. In the present non-limiting example, it is assumed that the processor 81 executes each step of the flowchart. Alternatively, a portion of the steps of the flowchart may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 17 and 18 may be executed by a plurality of information processing apparatuses including the main body apparatus 2 cooperating with each other.

In FIG. 17, the processor 81 performs initial setting for the information process (step S121), and proceeds to the next step. For example, in the initial setting, the processor 81 initializes parameters for performing processes described below.

Next, the processor 81 obtains operation data from each of the left controller 3, the right controller 4, and/or the main body apparatus 2, and updates the operation data Da (step S122), and proceeds to the next step.

Next, the processor 81 causes the first player character PC1 to perform an action based on the operation data Da (step S123), and proceeds to the next step. For example, the processor 81 causes the first player character PC1 to perform an action in the virtual space based on the operation data obtained in step S122 and virtual physical calculation in the virtual space, and the like, and updates the first player character data Db.

Next, the processor 81 causes the second player character PC2 to perform an action based on a predetermined action algorithm and virtual physical calculation in the virtual space, and the like (step S124), and proceeds to the next step. For example, the processor 81 causes the second player character PC2 to perform an action based on a predetermined action algorithm and virtual physical calculation in the virtual space, and the like, and updates the second player character data Dc. It should be noted that in the case where the second player character PC2 is caused to perform an action based on another user's operation, the processor 81 causes the second player character PC2 to perform an action based on operation data obtained by the second user's operation, virtual physical calculation in the virtual space, and the like in step S124, and updates the second player character data Dc. It should be noted that a computer that controls movements in the virtual space of the first and second game objects, at least one of which is a player object, which is operated by a user, corresponds to the processor 81 that performs step S123 and/or step S124, for example Next, the processor 81 sets a motion of a virtual camera (step S125), and proceeds to the next step. As a first non-limiting example, the processor 81 changes a location and/or orientation of the virtual camera such that the first player character PC1 is included in a central region (e.g., a region including a gaze point) of the range of view, and updates the virtual camera data Dd using the changed location and orientation of the virtual camera. It should be noted that in the case where a display range that corresponds to a portion of the range of view of the virtual camera is displayed on the display 12, the processor 81 changes the location and/or orientation of the virtual camera such that the first player character PC1 is included in a central region of the display range. As a second non-limiting example, the processor 81 changes the location and/or orientation of the virtual camera based on the operation data Da irrespective of the location of the first player character PC1. As a third non-limiting example, the processor 81 changes the location and/or orientation of the virtual camera according to a predetermined algorithm.

In step S125, the processor 81 also sets an end range for end control, using a virtual plane based on the set location and orientation of the virtual camera, and updates the end range data De. It should be noted that the set end range(s) is similar to that described with reference to FIGS. 9-13 and will not be herein described in detail. It should be noted that a computer that controls the range of view of the virtual camera based on at least the location in the virtual space of the first game object corresponds to the processor 81 that performs step S125, for example. A computer that determines a plane including a location in the virtual space corresponding to the bottom end of the display image as the virtual end plane corresponds to the processor 81 that performs step S125, for example.

Next, the processor 81 determines whether or not the second player character PC2 is located in the display range of the display 12 (step S126). If the processor 81 calculates that the second player character PC2 is located out of the display range, the processor 81 proceeds to step S127. Otherwise, if the processor 81 calculates that the second player character PC2 is located in the display range, the processor 81 resets the end control duration indicated by the end control duration data Df, and thereafter, proceeds to step S129.

In step S127, the processor 81 determines whether or not the calculated locations of the second player character PC2 indicate that the second player character PC2 has been moved out of the display range from an end range. For example, the result of the determination by the processor 81 in step S127 is positive if the calculated locations of the second player character PC2 indicate that the second player character PC2 has been moved out of the display range from an end range due to movement of the virtual camera, or that the second player character PC2 has been moved out of the display range from an end range due to movement of the second player character PC2 itself. If the processor 81 determines that the calculated locations of the second player character PC2 indicate that the second player character PC2 has been moved out of the display range from an end range, the processor 81 proceeds to step S128. Otherwise, if the processor 81 determines that the calculated locations of the second player character PC2 indicate that the second player character PC2 has been moved out of the display range without through any end range, the processor 81 resets the end control duration indicated by the end control duration data Df, and proceeds to step S129.

In step S128, the processor 81 performs an end control process, and proceeds to step S129. The end control process performed in step S128 will be described below with reference to FIG. 18.

In FIG. 18, the processor 81 determines whether or not the calculated locations of the second player character PC2 indicate that the second player character PC2 has been moved out of the display range from an end range due to movement of the range of view of the virtual camera (step S141). If the calculated locations of the second player character PC2 indicate that the second player character PC2 has been moved out of the display range from an end range due to movement of the range of view of the virtual camera, the processor 81 proceeds to step S142. Otherwise, if the calculated locations of the second player character PC2 do not indicate that the second player character PC2 has been moved out of the display range from an end range due to movement of the range of view of the virtual camera, the processor 81 proceeds to step S144.

In step S142, the processor 81 changes the location in the virtual space of the second player character PC2 from a location out of the display range into the end range closest thereto, and proceeds to the next step. For example, as in the end control described with reference to FIGS. 9-13, the processor 81 changes the location of the second player character PC2 such that the second player character PC2 remains in the end range, and updates the second player character data Dc.

Next, the processor 81 sets an action of the second player character PC2 to an action of moving toward a central region of the display region (step S143), and proceeds to step S144. For example, the processor 81 sets an action of the second player character PC2 to an action of moving from a location before the location change in step S142 to a location after the location change, and updates the second player character data Dc.

In step S144, the processor 81 determines whether or not the calculated locations of the second player character PC2 indicate that the second player character PC2 has been moved out of the display range from an end range due to movement of the second player character PC2 itself. If the calculated locations of the second player character PC2 indicate that the second player character PC2 has been moved out of the display range from an end range due to movement of the second player character PC2 itself, the processor 81 proceeds to step S145. Otherwise, if the calculated locations of the second player character PC2 do not indicate that the second player character PC2 has been moved out of the display range from an end range due to movement of the second player character PC2 itself, the processor 81 proceeds to step S147.

In step S145, the processor 81 changes the location in the virtual space of the second player character PC2 from a location out of the display range into the end range closest thereto, and proceeds to the next step. For example, as in the end control described with reference to FIGS. 9-13, the processor 81 changes the location of the second player character PC2 such that the second player character PC2 remains in the end range, and updates the second player character data Dc.

Next, the processor 81 causes the second player character PC2 to continue to perform the current action of trying to move out of the display region from the end region (step S146), and proceeds to step S147. For example, the processor 81 maintains the action of the second player character PC2 as it is.

In step S147, the processor 81 updates the end control duration, and proceeds to the next step. For example, the processor 81 updates the end control duration data Df by incrementing the end control duration indicated by the end control duration data Df.

Next, the processor 81 determines whether or not the end control duration indicated by the end control duration data Df has reached the waiting period (step S148). If the end control duration has reached the waiting period, the processor 81 proceeds to step S149. Otherwise, if the end control duration has not reached the waiting period, the processor 81 ends the subroutine.

In step S149, the processor 81 changes the location of the second player character PC2 to a location in the vicinity of the first player character PC1, and proceeds to the next step. For example, the processor 81 sets the location of the second player character PC2 to a location where the second player character PC2 is adjacent to the first player character PC1, and updates the second player character data Dc.

Next, the processor 81 sets an action of the second player character PC2 to a predetermined action (step S150), and ends the subroutine. For example, the processor 81 resets the end control duration indicated by the end control duration data Df, sets an action of the second player character PC2 to a predetermined action, and updates the second player character data Dc.

Referring back to FIG. 17, in step S129, the processor 81 determines whether or not the second player character PC2 has reached a location that is at least a predetermined distance away from the first player character PC1. For example, the result of the determination by the processor 81 in step S129 is positive if the second player character PC2 has reached a location that is away from the virtual camera in the virtual space and is at least the predetermined threshold distance away from the first player character PC1. If the second player character PC2 has reached a location that is at least the predetermined distance away from the first player character PC1, the processor 81 proceeds to step S130. Otherwise, if the second player character PC2 has not reached a location that is at least the predetermined distance away from the first player character PC1, the processor 81 proceeds to step S131.

In step S130, the processor 81 changes the location of the second player character PC2 to a location in the vicinity of the first player character PC1, and proceeds to step S133. For example, the processor 81 sets the location of the second player character PC2 to a location where the second player character PC2 is adjacent to the first player character PC1, and updates the second player character data Dc. It should be noted that the action of the second player character PC2 may be maintained as it is, or may be changed to a rest or other actions.

In step S131, the processor 81 determines whether or not the calculated location of the second player character PC2 is out of the display range of the display 12. If the calculated location of the second player character PC2 is out of the display range of the display 12, the processor 81 proceeds to step S132. Otherwise, if the calculated location of the second player character PC2 is in the display range of the display 12, the processor 81 proceeds to step S133.

In step S132, the processor 81 performs an out-of-display range process, updates the second player character data Dc, and proceeds to step S133. As a non-limiting example, the out-of-display range process forces the second player character PC2 to move to a location in the virtual space corresponding to a location in the display range. As another non-limiting example, a predetermined process (a process of giving a predetermined penalty to the second player character PC2) is performed on the second player character PC2 before the forced movement to a location in the virtual space corresponding to a location in the display range. It should be noted that if the calculated locations of the first player character PC1 indicate that the first player character PC1 has been moved out of the display range of the display 12 without through any end range, the result of the determination in step S131 may be positive, and the out-of-display range process of step S132 may be performed on the first player character PC1.

In step S133, the processor 81 performs a display control process, and proceeds to the next step. For example, the processor 81 performs control to dispose the virtual camera and the first and second player characters PC1 and PC2 and the like in the virtual space, and display, on the display 12, the range of view of the virtual camera as a display range of the virtual space, based on the process results of steps S121-S132, the first player character data Db, the second player character data Dc, the virtual camera data Dd, the image data Dg, and the like. It should be noted that a computer that generates a display image to be displayed on a display screen, based on the virtual camera, corresponds to the processor 81 that performs step S133, for example.

Next, the processor 81 determines whether or not to end the game process (step S134). The condition for ending the game process in step S134 is, for example, that the condition for ending the game process is satisfied, that the user performs an operation of ending the game process, etc. If the processor 81 does not determine to end the game process, the processor 81 returns to step S122, and repeats the process. If the processor 81 determines to end the game process, the processor 81 ends the process of the flowchart. Thereafter, steps S122-S134 are repeatedly executed until the processor 81 determines, in step S134, to end the game process.

Thus, in the present non-limiting example, even when at least one of a plurality of game objects is moved out of a display range of a display image as in conventional examples, the game object is moved to a location other than an end range of the display range after a predetermined period of time has passed since end control was performed to cause the game object to remain in the display range. Therefore, a state of a game object disposed in a virtual space can be easily recognized or the like.

It should be noted that in the above non-limiting example, a player character is moved to a location other than an end range when the end control process has continued for a predetermined waiting period. Even when the end control process is temporarily suspended, counting of the duration may be continued. For example, in the above process flow, even when the end control process is temporarily suspended after the start thereof, then if the number of times of the suspension is less than a predetermined value, resetting of the end control duration indicated by the end control duration data Df may be postponed. As a result, even when the end control process is momentarily interrupted due to the user's undetermined operation or the like, the above player character control can be performed by removing the result of the undetermined operation.

In the above non-limiting example, it is determined whether or not a player character is located in a display range or end range of a display image. The determination may be based on any suitable criterion. As a first non-limiting example, the determination may be based on a feature point such as a location of a reference point for setting a location of a player character, a center-of-gravity location of a player character, or a location of a center of a main portion of a player character. As a second non-limiting example, if at least a predetermined proportion (e.g., at least 50%) of a player character is included in a display range or end range, the player character may be determined to be located in the display range or end range. In both of the cases, even when a portion of a player character is not included in a display range or end range, then if the above feature point thereof is included in the display range or end range, the player character is determined to be located in the display range or end range. As a third non-limiting example, the determination may be based on whether or not a player character is entirely included in a display range or end range. Alternatively, the determination may be based on whether or not a player character is entirely out of a display range or end range.

In the above non-limiting example, no wall is provided at an outer periphery of a display range of a display image, and a location of a player character is corrected so that the player character remains in the display range when the location is moved beyond a virtual plane corresponding to the outer periphery of the display range. Alternatively, a wall may be provided at the outer periphery in the virtual space, and a player character may be controlled such that the player character cannot move beyond the wall.

It should be noted that the game system 1 may be any suitable apparatus, including a handheld game apparatus, or any suitable handheld electronic apparatus (a personal digital assistant (PDA), mobile telephone, personal computer, camera, tablet computer, etc.), etc. In that case, an input apparatus for performing an operation of causing a player character PC to perform an action may be, instead of the left controller 3, the right controller 4, or the touch panel 13, another controller, mouse, touchpad, touch panel, trackball, keyboard, directional pad, slidepad, etc.

In the foregoing, the information process (game process) is performed in the game system 1. Alternatively, at least a portion of the process steps may be performed in another apparatus. For example, when the game system 1 can also communicate with another apparatus (e.g., another server, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above non-limiting example, the information process can be performed by the processor 81 of the game system 1 executing a predetermined program. Alternatively, all or a portion of the above process may be performed by a dedicated circuit included in the game system 1.

Here, according to the above non-limiting variation, the present non-limiting example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and the present non-limiting example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the present non-limiting example.

The above program may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of the present non-limiting example and common technical knowledge. It should be understood throughout the present specification that expression of a singular form includes the concept of its plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which the present non-limiting example pertain. If there is any inconsistency or conflict, the present specification (including the definitions) shall prevail.

As described above, the present non-limiting example is applicable as an information processing program, information processing system, information processing apparatus, and information processing method, etc., that can facilitate recognition of a state of a game object disposed in a virtual space.

What is claimed is:

1. A non-transitory computer-readable storage medium having stored therein an information processing program that when executed by a computer of an information processing apparatus, causes the computer to perform operations comprising:
controlling movements of a first and a second game object in a virtual space, at least one of the first and second game objects being a player object that is operated by a user;
controlling a range of view of a virtual camera based on a location in the virtual space of at least the first game object; and
generating a display image to be displayed on a display screen, based on the virtual camera,
wherein
the controlling the game objects includes
when the second game object is located in an end range in the virtual space relating to a first end portion of a display range of the display image, the end range being in the display range, performing end control that causes the second game object to remain in the end range while the range of view is being moved in a first direction in the virtual space that is a direction perpendicular to the first end portion and aimed at inside of the display range and/or while the second game object is performing an action of moving in a second direction opposite to the first direction, and
moving the second game object to a location other than the end range in a range in the virtual space relating to the display range when the end control has continued for at least a waiting period.

2. The non-transitory computer-readable storage medium according to claim 1, wherein
the range of view of the virtual camera is controlled such that the first game object is included in a central region of the display range.

3. The non-transitory computer-readable storage medium according to claim 1, wherein
when the second game object is located in the end range, the end control is performed by forcing the second game object to move in the virtual space while the range of view is being moved in the first direction.

4. The non-transitory computer-readable storage medium according to claim 3, wherein
when the range of view is moved in the first direction with the second game object located in the end range, the second game object is forced to move in the virtual space by causing the second game object to perform an action of moving from the end range toward a location in the virtual space relating to a central region of the display range.

5. The non-transitory computer-readable storage medium according to claim 1, wherein
when the second game object is located in the end range, the end control is performed by causing the second game object not to move out of the end range while the second game object is performing an action of moving in the second direction.

6. The non-transitory computer-readable storage medium according to claim 1, wherein
the first end portion includes a left end portion of the display image.

7. The non-transitory computer-readable storage medium according to claim 1, wherein
the first end portion includes a bottom end portion of the display image.

8. The non-transitory computer-readable storage medium according to claim 7, wherein
the information processing program further causes the computer to perform operations comprising:
determining a plane including a location in the virtual space relating to the bottom end of the display image as a virtual end plane, and
when the second game object is located on the virtual end plane, the end control is performed to cause the second game object to remain in a range in the virtual space relating to the virtual end plane while the range of view is being moved in a direction in the virtual space that is an upward direction of the display screen and/or while the second game object is performing an action of moving in a direction in the virtual space that is a downward direction of the display screen.

9. The non-transitory computer-readable storage medium according to claim 8, wherein
a vertical plane in the virtual space including a line segment that is an intersection of a horizontal plane in the virtual space on which the first game object is located and a plane in the virtual space relating to the bottom end of the display image is determined as the virtual end plane.

10. The non-transitory computer-readable storage medium according to claim 1, wherein
when the second game object is moved to a range in the virtual space relating to a range out of the display range without the end control, the second game object is forced to move to a range in the virtual space relating to a range in the display range.

11. The non-transitory computer-readable storage medium according to claim 1, wherein
the end control is not performed at a top end of the display image.

12. The non-transitory computer-readable storage medium according to claim 1, wherein
when the second game object is moved in a direction away from the virtual camera along a line-of-view direction of the virtual camera, so that the second game object is at least a first distance away from the virtual camera or the first game object, the second game object is forced to move to a location that is less than the first distance away from the virtual camera or the first game object.

13. The non-transitory computer-readable storage medium according to claim 1, wherein
the range of view of the virtual camera is controlled based on a user's operation, and
when the range of view of the virtual camera is changed by the user's operation, the end range in the virtual space is changed.

14. The non-transitory computer-readable storage medium according to claim 1, wherein
even when the second game object is located in the end range, the second game object is not controlled to move to a location other than the end range while the range of view is not being moved in the first direction and the second game object is not performing an action of moving in the second direction.

15. The non-transitory computer-readable storage medium according to claim 1, wherein
when the end control has continued for at least the waiting period, the second game object is moved to a location in a vicinity of the first game object.

16. The non-transitory computer-readable storage medium according to claim 1, wherein
when the end control has continued for at least the waiting period, the second game object is moved to a location relating to a central region of the display range.

17. The non-transitory computer-readable storage medium according to claim 1, wherein
the end range in which the second game object remains is set using a plane in the virtual space that is set, relating to the display range.

18. An information processing system comprising a computer configured to control the information processing system to at least:
control movements of a first and a second game object in a virtual space, at least one of the first and second game objects being a player object that is operated by a user;
control a range of view of a virtual camera based on a location in the virtual space of at least the first game object; and
generate a display image to be displayed on a display screen, based on the virtual camera,
wherein
the controlling the game objects includes
when the second game object is located in an end range in the virtual space relating to a first end portion of a display range of the display image, the end range being in the display range, performing end control that causes the second game object to remain in the end range while the range of view is being moved in a first direction in the virtual space that is a direction perpendicular to the first end portion and aimed at inside of the display range and/or while the second game object is performing an action of moving in a second direction opposite to the first direction, and
moving the second game object to a location other than the end range in a range in the virtual space relating to the display range when the end control has continued for at least a waiting period.

19. An information processing apparatus comprising a computer configured to control the information processing apparatus to at least:
control movements of a first and a second game object in a virtual space, at least one of the first and second game objects being a player object that is operated by a user;

control a range of view of a virtual camera based on a location in the virtual space of at least the first game object; and generate a display image to be displayed on a display screen, based on the virtual camera, wherein the controlling the game objects includes when the second game object is located in an end range in the virtual space relating to a first end portion of a display range of the display image, the end range being in the display range, performing end control that causes the second game object to remain in the end range while the range of view is being moved in a first direction in the virtual space that is a direction perpendicular to the first end portion and aimed at inside of the display range and/or while the second game object is performing an action of moving in a second direction opposite to the first direction, and moving the second game object to a location other than the end range in a range in the virtual space relating to the display range when the end control has continued for at least a waiting period.

20. An information processing method comprising:

controlling movements of a first and a second game object in a virtual space, at least one of the first and second game objects being a player object that is operated by a user;

controlling a range of view of a virtual camera based on a location in the virtual space of at least the first game object; and generating a display image to be displayed on a display screen, based on the virtual camera, wherein the controlling the game objects includes when the second game object is located in an end range in the virtual space relating to a first end portion of a display range of the display image, the end range being in the display range, performing end control that causes the second game object to remain in the end range while the range of view is being moved in a first direction in the virtual space that is a direction perpendicular to the first end portion and aimed at inside of the display range and/or while the second game object is performing an action of moving in a second direction opposite to the first direction, and moving the second game object to a location other than the end range in a range in the virtual space relating to the display range when the end control has continued for at least a waiting period.

\* \* \* \* \*